United States Patent
Jung et al.

(10) Patent No.: US 12,101,006 B2
(45) Date of Patent: Sep. 24, 2024

(54) MOTOR, AND METHOD FOR MANUFACTURING STATOR PROVIDED IN MOTOR

(71) Applicant: LG INNOTEK CO., LTD., Seoul (KR)

(72) Inventors: Young Hwan Jung, Seoul (KR); Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 204 days.

(21) Appl. No.: 17/758,414

(22) PCT Filed: Dec. 16, 2020

(86) PCT No.: PCT/KR2020/018415
§ 371 (c)(1),
(2) Date: Jul. 6, 2022

(87) PCT Pub. No.: WO2021/141267
PCT Pub. Date: Jul. 15, 2021

(65) Prior Publication Data
US 2023/0037924 A1    Feb. 9, 2023

(30) Foreign Application Priority Data

Jan. 6, 2020 (KR) .................. 10-2020-0001507
Jan. 6, 2020 (KR) .................. 10-2020-0001508

(51) Int. Cl.
*H02K 5/04* (2006.01)
*B62D 5/04* (2006.01)
(Continued)

(52) U.S. Cl.
CPC ............... *H02K 15/10* (2013.01); *B62D 5/04* (2013.01); *H02K 1/14* (2013.01); *H02K 3/34* (2013.01); *H02K 15/02* (2013.01)

(58) Field of Classification Search
CPC .......... H02K 15/02; H02K 3/522; H02K 3/34; H02K 1/14; H02K 15/10; B62D 5/04
See application file for complete search history.

(56) References Cited

U.S. PATENT DOCUMENTS 7,382,075 B2 * 6/2008 Wang ..................... H02K 3/522
                                                          310/260
7,586,231 B2 * 9/2009 Wang ..................... H02K 3/522
                                                          310/260
(Continued)

FOREIGN PATENT DOCUMENTS

CN    204361796 U    5/2015
KR    10-0465692 B1  1/2005
(Continued)

OTHER PUBLICATIONS

KR-20200123904-A machine translation Mar. 23, 2024.*
International Search Report dated Mar. 23, 2021 in International Application No. PCT/KR2020/018415.

*Primary Examiner* — Leda T Pham
(74) *Attorney, Agent, or Firm* — Saliwanchik, Lloyd & Eisenschenk

(57) ABSTRACT

According to an embodiment, provided is a motor which comprises: a shaft; a rotor coupled to the shaft; a stator disposed corresponding to the rotor; and a housing disposed on the outside of the stator. The stator includes: a stator core; an insulator coupled to the stator core; a plurality of projections extending from the lower end of the insulator; and a protruding portion disposed below the insulator and fixed to the housing. The plurality of projections are spaced apart from each other in the circumferential direction, and at least a portion of the protruding portion is disposed in the spaces formed between the plurality of projections.

16 Claims, 23 Drawing Sheets

(51) Int. Cl.
*H02K 1/14* (2006.01)
*H02K 3/34* (2006.01)
*H02K 15/02* (2006.01)
*H02K 15/10* (2006.01)

(56) References Cited

U.S. PATENT DOCUMENTS

| | | | |
|---|---|---|---|
| 7,965,012 B2 * | 6/2011 | Murakami | H02K 3/522 |
| | | | 310/194 |
| 2011/0081258 A1 | 4/2011 | Yoshida et al. | |
| 2020/0395806 A1 * | 12/2020 | Kim | H02K 5/225 |

FOREIGN PATENT DOCUMENTS

| | | |
|---|---|---|
| KR | 10-2008-0026872 A | 3/2008 |
| KR | 10-1170156 B1 | 7/2012 |
| KR | 10-1787710 B1 | 10/2017 |
| KR | 20200123904 A * | 11/2020 |

* cited by examiner

MOTOR, AND METHOD FOR MANUFACTURING STATOR PROVIDED IN MOTOR

CROSS-REFERENCE TO RELATED APPLICATIONS

This application is the U.S. national stage application of International Patent Application No. PCT/KR2020/018415, filed Dec. 16, 2020, which claims the benefit under 35 U.S.C. § 119 of Korean Application Nos. 10-2020-0001507, filed Jan. 6, 2020; and 10-2020-0001508, filed Jan. 6, 2020; the disclosures of each of which are incorporated herein by reference in their entirety.

TECHNICAL FIELD

The present invention is directed to providing a motor in which a slip phenomenon of a stator is inhibited and of which a manufacturing process of the stator is simplified, and a method of manufacturing a stator included in the same.

BACKGROUND ART

A motor includes a shaft, a rotor, and a stator. The stator includes a plurality of stator cores. For insulation, an insulator is provided on the stator core. In addition, a coil is wound around the insulator. A phenomenon in which the stator slips in a housing occurs. In addition, the insulator is assembled with each tooth on the stator, the teeth are arranged, and thus there is a problem that the number of manufacturing processes is increased.

DISCLOSURE

Technical Problem

The present invention is directed to providing a motor in which a slip phenomenon of a stator is prevented and of which a manufacturing process of the stator is simplified, and a method of manufacturing a stator included in the same.

Technical Solution

One aspect of the present invention provides a motor including a shaft, a rotor coupled to the shaft, a stator disposed to correspond to the rotor, and a housing disposed outside the stator, wherein the stator includes a stator core, an insulator coupled to the stator core, a plurality of protrusions extending from a lower end of the insulator, and a protruding part disposed at a lower side of the insulator and fixed to the housing, the plurality of protrusions are disposed apart from each other in a circumferential direction, and at least a part of the protruding part is disposed in a separation space formed between the plurality of protrusions.

An upper end of the protruding part may be disposed at a higher level than a lower end of the protrusion.

The protrusion may include a first protrusion extending from one side of a lower end of the insulator and a second protrusion extending from another side of the lower end of the insulator, wherein the first protrusion and the second protrusion may be disposed apart from each other in the circumferential direction with the protruding part interposed therebetween.

A width of the separation space in the circumferential direction may be greater than a width of the protruding part in the circumferential direction.

The protruding part may be provided as a plurality of protruding parts, the plurality of protruding parts may be disposed on a lower surface of the housing, and the plurality of protruding parts may be disposed in a radial direction.

The insulator may include a first insulator and a second insulator adjacent to the first insulator, wherein the first insulator may include a first bridge extending toward the second insulator, and the second insulator may include a second bridge extending toward the first bridge.

A burr may be formed on each of a cross section of the first bridge and a cross section of the second bridge.

The stator core may include a yoke and a plurality of teeth protruding from the yoke, the insulator may include a body surrounding the tooth and a guide extending from the body, the protrusion may extend from a lower side of the guide, and the bridge may extend from a side surface of the guide.

Another aspect of the present invention provides a method of manufacturing a stator included in a motor, the method including a preparing operation of preparing a plurality of stator cores and insulators connected by a plurality of bridges, a coupling operation of coupling the plurality of stator cores and the insulators, a cutting operation of cutting one side of each of the bridges to divide the stator cores, a winding operation of winding a coil around each of the plurality of stator cores, and an arranging operation of arranging the plurality of stator cores.

The cutting operation may include dividing the bridges into a first bridge extending from any one insulator and a second bridge extending from another insulator.

Advantageous Effects

According to embodiments, when a stator expands due to high temperatures while a protrusion extending from a stator and a rib (protrusion) protruding from a bottom surface of the housing are engaged with each other in a rotational direction, a phenomenon in which a stator slips in a housing in the rotational direction can be inhibited. Accordingly, operational reliability of a motor can be improved.

According to the embodiments, since an integrated insulator is installed on a plurality of stator cores and then cut to divide the stator cores, cumbersomeness in assembling an insulator with each stator core can be reduced, and a process of manufacturing the stator can be simplified.

MODES OF THE INVENTION

Hereinafter, exemplary embodiments of the present invention will be described in detail with reference to the accompanying drawings.

A direction parallel to a longitudinal direction (vertical direction) of a shaft will be referred to as an axial direction, a direction perpendicular to the axial direction through the shaft will be referred to as a radial direction, and a direction along a circumference of a circle having a radius in the radial direction through the shaft will be referred to as a circumferential direction.

Figure 1:
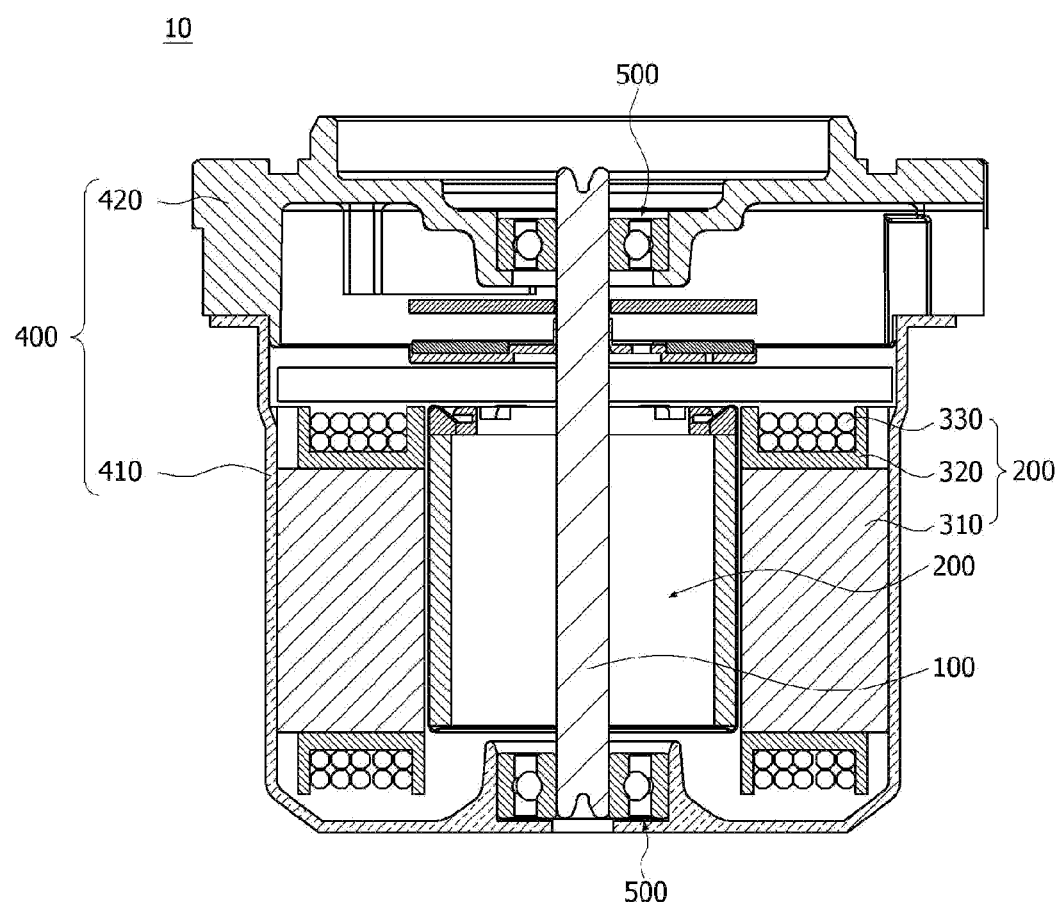
FIG. 1 is a cross-sectional view illustrating a motor according to an embodiment.

FIG. 1 is a cross-sectional view illustrating a motor according to an embodiment.

Referring to FIG. 1, the motor according to the embodiment may include a shaft 100, a rotor 200, a stator 300, a housing 400, and bearings 500

The shaft 100 is coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 may be connected to a vehicle's steering system and may transmit power to the vehicle's steering system.

The rotor 200 rotates through an electrical interaction with the stator 300.

The rotor 200 may include a rotor core and magnets. The rotor core may be formed in a form in which a plurality of thin circular steel plates are stacked or one cylindrical shape. A hole to which the shaft 100 is coupled may be formed in a central portion of the rotor core. Protrusions which guide the magnets may protrude from an outer circumferential surface of the rotor core. The magnets may be attached to the outer circumferential surface of the rotor core. The plurality of magnets may be disposed at predetermined intervals along a circumference of the rotor core. The rotor 200 may include a can member which surrounds and fixes the magnets to prevent inhibit the magnets from being separated from the rotor core and exposed.

A coil may be wound around the stator 300 to induce an electrical interaction occurring between the stator and the rotor 200. Specific components of the stator 300 for winding the coil are as follows. The stator 300 may include a stator core 310 including a plurality of teeth. In the stator core 310, an annular yoke portion may be provided, and the teeth around which the coil is wound from the yoke toward a center may be provided. The teeth may be provided at predetermined intervals along an outer circumferential surface of the yoke portion. Meanwhile, the stator core 310 may be formed by stacking a plurality of thin steel plates. In addition, the stator core 310 may be formed by coupling or connecting a plurality of divided cores. The insulator 320 may be installed on the teeth of the stator core 310. The coil 330 may be wound around the insulator 320.

In the housing 400, a space for accommodating the rotor 200 and the stator 300 is formed. The housing 400 may be formed of a metal material.

The housing 400 may include a housing body 410 and a housing cover 420. The housing body 410 may be formed in a cylindrical shape having an open upper side. The housing cover 420 may cover an open upper portion of the housing body 410. The bearing 500 is disposed on each of the housing body 410 and the housing cover 420.

The bearings 500 rotatably support the shaft 100. The bearings 500 may be coupled to an upper end portion and a lower end portion of the shaft 100. In this case, the bearing 500 coupled to the upper end portion of the shaft 100 may be disposed on the housing cover 420, and the bearing 500 coupled to the lower end portion of the shaft 100 may be disposed on the housing body 410.

Figure 2:
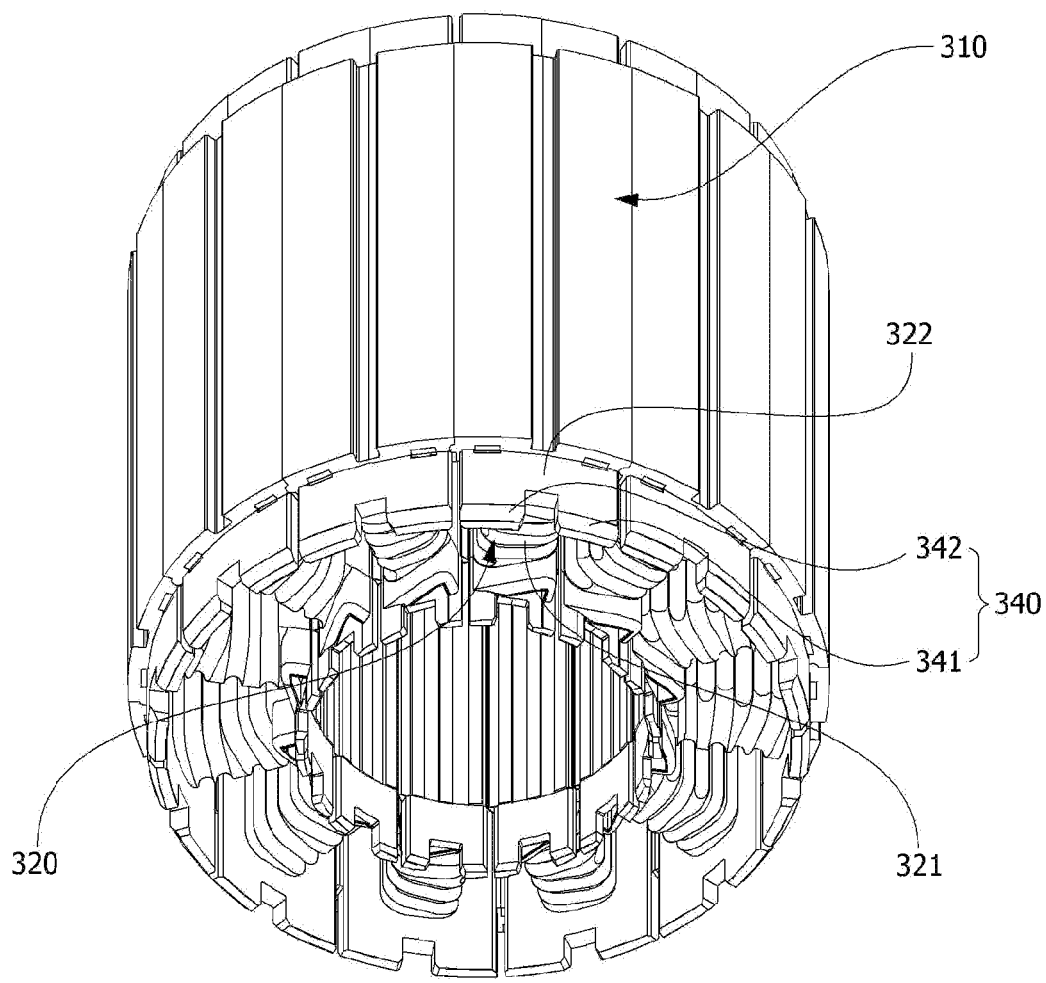
FIG. 2 is a perspective view illustrating a stator of a motor according to a first embodiment.
Figure 3:
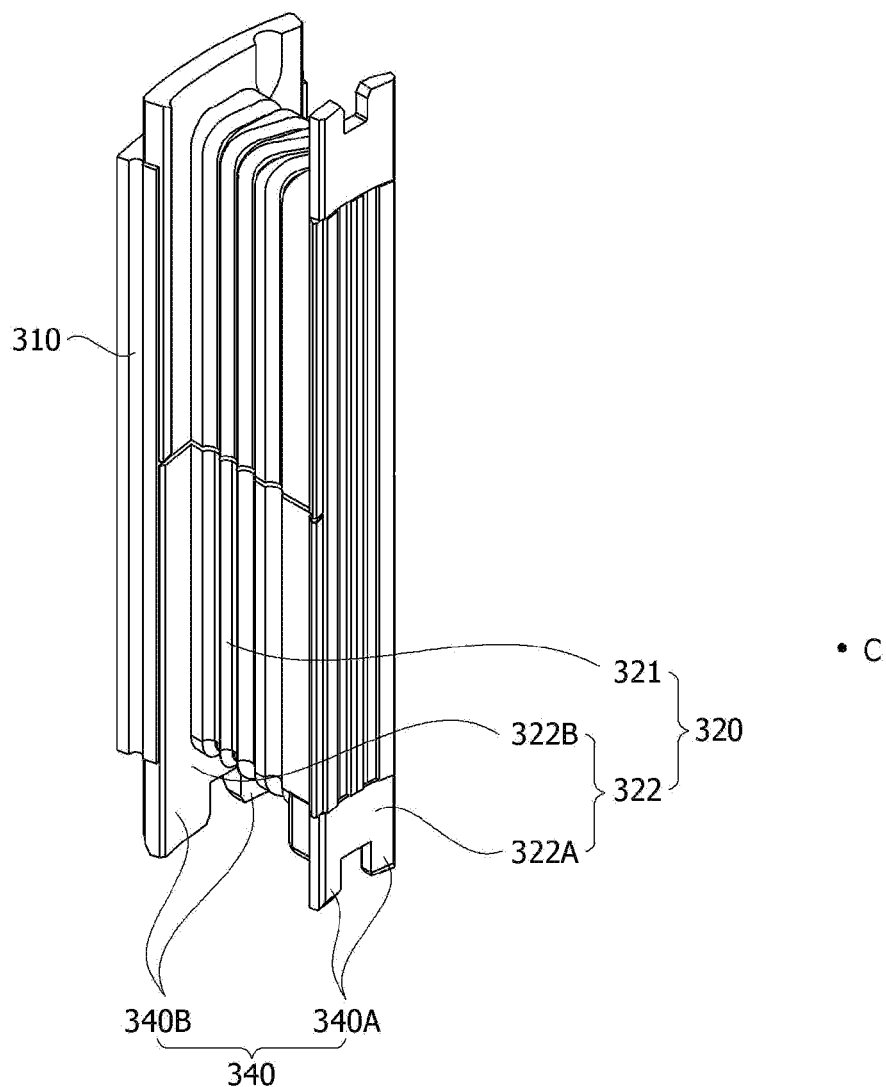
FIG. 3 is a perspective view illustrating a part of the stator.

FIGS. 2 and 3 are views illustrating a stator core, an insulator, and protrusions of a stator disposed in a motor according to an embodiment.

Referring to FIG. 2, an insulator 320 is coupled to a stator core 310. The insulator 320 is provided as a plurality of insulators 320. The insulator 320 may include a body 321 and a guide 322. The body 321 is a portion around which a coil 330 is wound and disposed. The body 321 may include a plurality of grooves which are concavely formed. In this case, the grooves may guide an arrangement of the coil. The guide 322 extends from the body 321. The guide 322 inhibits the wound coil 330 from being separated. In this case, a length of the guide 322 may be greater than a length of the body 321 in an axial direction. In this case, an upper end of the guide 322 may protrude upward further than an upper end of the body 321. In addition, a lower end of the guide 322 may protrude downward further than a lower end of the body 321.

A protrusion 340 extends from a lower end of the insulator 320. In this case, the protrusion 340 may extend from the guide 322. The protrusion 340 may include a first protrusion 341 and a second protrusion 342. The first protrusion 341 may extend from one side of the lower end of the guide 322. In addition, the second protrusion 342 may extend from another side of the lower end of the guide 322. The first protrusion 341 and the second protrusion 342 may be disposed apart from each other in a circumferential direction. In this case, a separation space may be formed between the first protrusion 341 and the second protrusion 342.

Referring to FIG. 3, the guide 322 may include a first guide 322A and a second guide 322B.

The first guide 322A extends from an inner side of the body 321. In addition, the second guide 322B extends from an outer side of the body 321. That is, the first guide 322A is disposed closer to an axial center C than the second guide 322B. The first guide 322A and the second guide 322B are spaced apart from each other with the body 321 interposed therebetween in a radial direction. In this case, a width of the first guide 322A in the circumferential direction may be smaller than a width of the second guide 322B in the circumferential direction.

The protrusion 340 may extend from the first guide 322A and the second guide 322B. The protrusion 340 may include a first part 340A and a second part 340B. The first part 340A extends from a lower end of the first guide 322A. In addition, the second part 340B extends from a lower end of the second guide 322B. The first part 340A and the second part 340B are spaced apart from each other in the radial direction. In this case, the first part 340A is disposed closer to the axial center C than the second part 340B.

Figure 4:
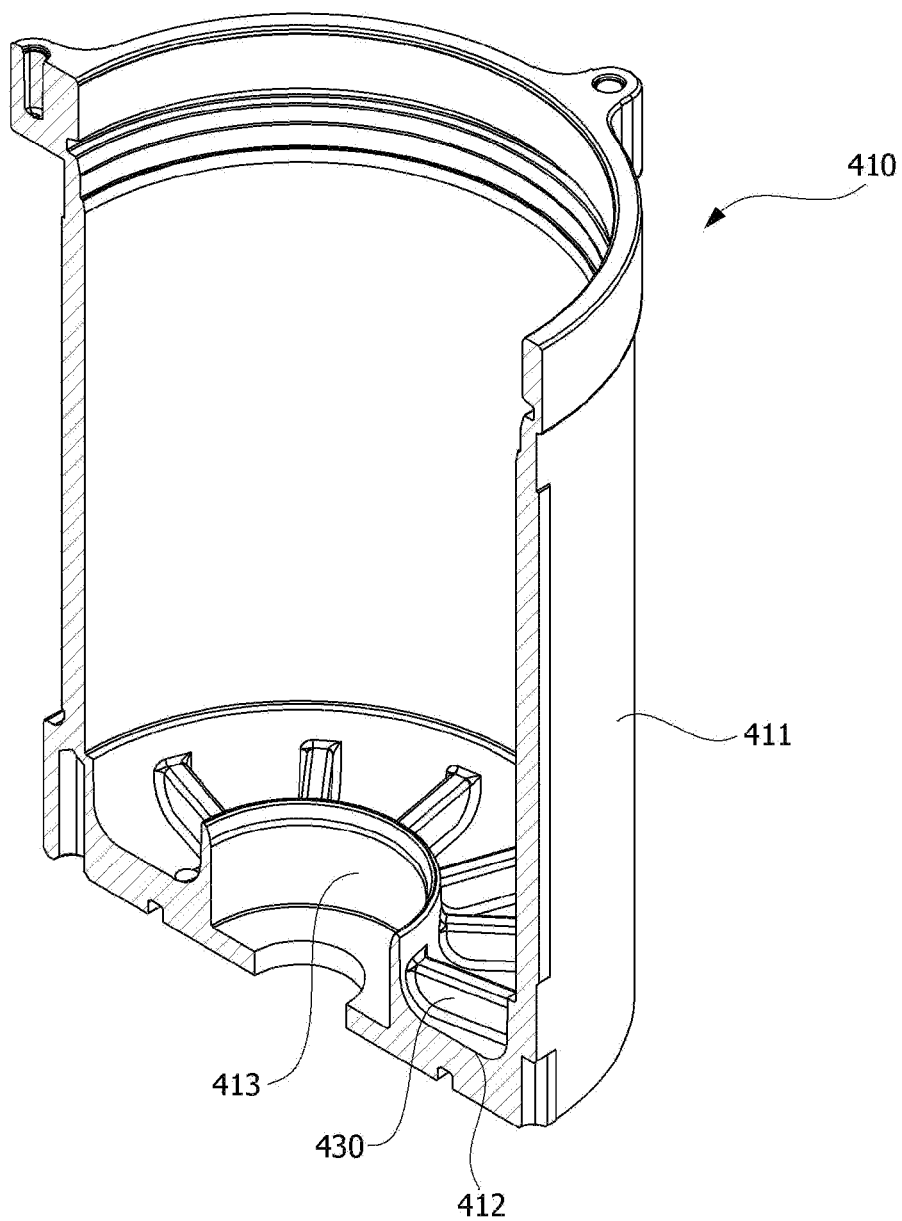
FIG. 4 is a cross-sectional perspective view illustrating a housing body.
Figure 5:
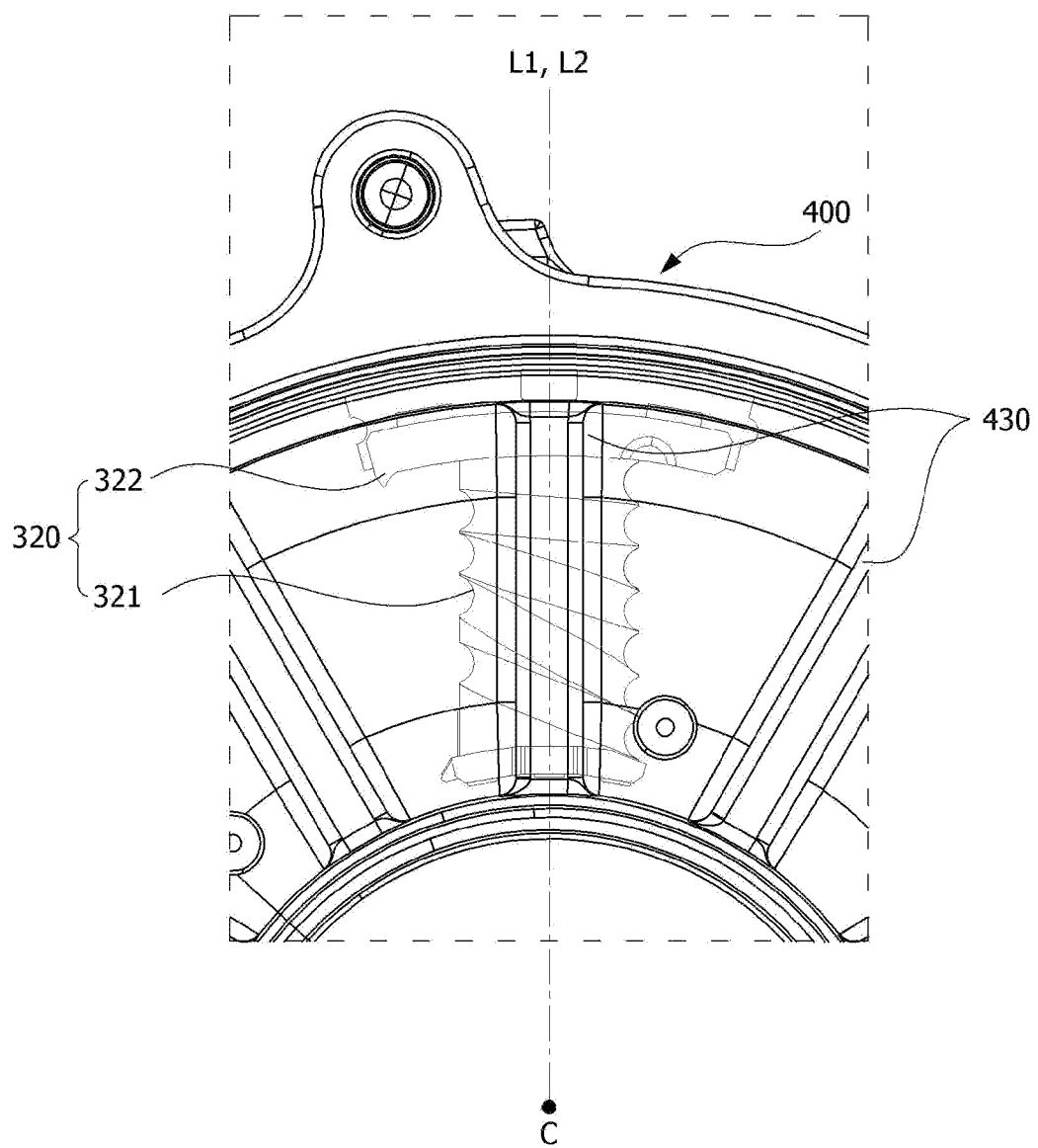
FIG. 5 is a plan view illustrating a state in which an insulator is disposed on the housing body.
Figure 6:
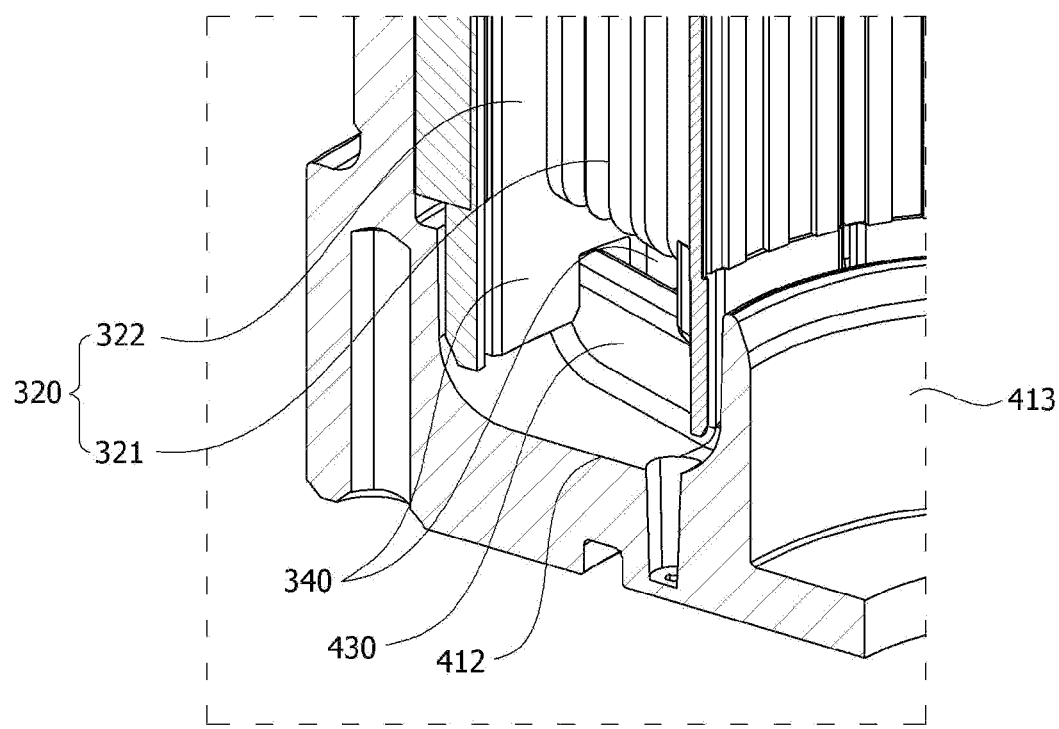
FIG. 6 is a partial perspective view illustrating the state in the insulator is disposed in the housing body.

FIG. 4 is a cross-sectional perspective view illustrating a housing body, FIG. 5 is a plan view illustrating a state in which the insulator is disposed on the housing body of the motor according to the embodiment, and FIG. 6 is a partial perspective view illustrating the state in the insulator is disposed in the housing body of the motor according to the embodiment.

Referring to FIG. 4, a housing body 410 may include a side surface 411, a lower surface 412, and a bearing pocket part 413.

The side surface 411 may have a cylindrical shape. A rotor 200 and a stator 300 are disposed inside the side surface 411. A cover 420 may be coupled to an upper end of the side surface 411. In addition, the lower surface 412 may extend inward from a lower end of the side surface 411. The lower surface 412 and the side surface 411 are disposed perpendicularly to each other. The bearing pocket part 413 may be disposed in a central portion of the lower surface 412. A bearing 500 may be disposed inside the bearing pocket part 413. The bearing pocket part 413 may be disposed to surround a lower surface and a side surface of the bearing 500. In this case, a hole through which a shaft 100 passes may be formed in a bottom surface of the bearing pocket part 413.

A protruding part 430 may be disposed on the lower surface 412. The protruding part 430 may have a rib shape. The protruding part 430 may be provided as a plurality of protruding parts 430. The plurality of protruding parts 430 may be radially disposed. The protruding parts 430 may connect the side surface 411 and the bearing pocket part 413 in the radial direction.

Referring to FIG. 5, the insulator 320 may be disposed above the protruding part 430. In this case, a virtual line L1 connecting the axial center C and a center of a width of the protruding part 430 may be the same as a virtual line L2 connecting the axial center C and a center of a width of the body 321 of the insulator 320.

Referring to FIG. 6, at least a part of the protruding part 430 is disposed in a separation space between protrusions 340. In this case, at least a part of the protrusion 340 may overlap the protruding part 430 in the circumferential direction. Accordingly, movement of the protruding part 430 may be restricted with respect to the insulator 320 in the circumferential direction due to the protrusion 340. In this case, a separation distance between the protrusions 340 may be formed to be greater than a width of the protruding part 430. The protruding part 430 may be spaced apart from the protrusion 340 in the circumferential direction. For example, the protruding part 430 may be spaced 0.2 to 1 mm from the insulator 320 in the circumferential direction. Accordingly, the protruding part 430 may move the separation distance with respect to the insulator 320 in the circumferential direction. However, when the protruding part 430 moves 1 mm or more with respect to the insulator 320 in the circumferential direction, the protruding part 430 may be hooked on the protrusion 340, and the movement of the protruding part 430 may be restricted.

Figure 7:
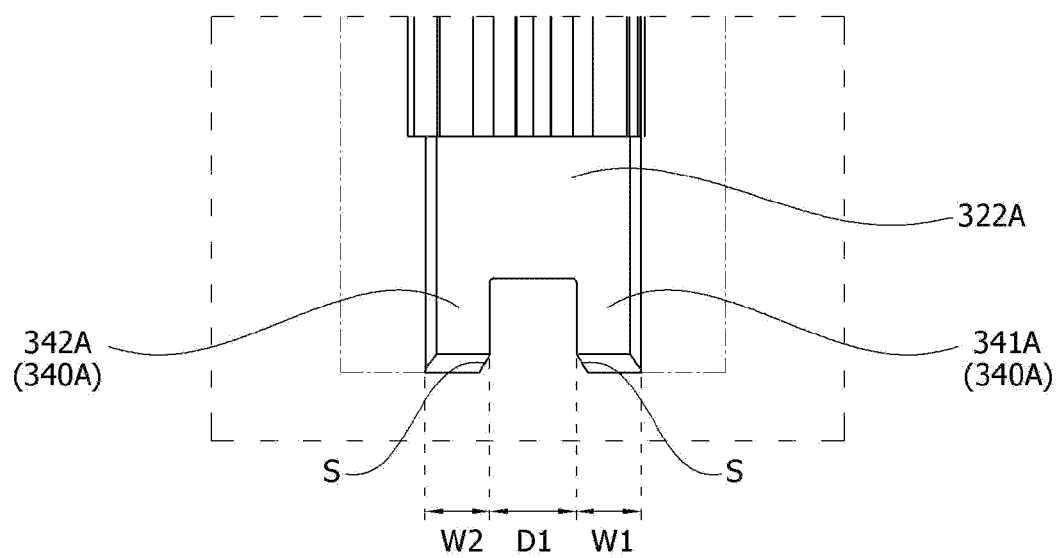
FIG. 7 is a view illustrating a first part from an axial center of the stator.

FIG. 7 is a view illustrating the first part from an axial center of the stator.

Referring to FIG. 7, the first part 340A may include a 1-1 protrusion 341A and a 1-2 protrusion 342A. The 1-1 protrusion 341A may extend from one side of the lower end of the first guide 322A. In addition, the 1-2 protrusion 342A may extend from another side of the lower end of the first guide 322A. A width W1 of 1-1 protrusion 341A in the circumferential direction may be the same as a width W2 of the 1-2 protrusion 342A in the circumferential direction.

The 1-1 protrusion 341A and the 1-2 protrusion 342A may be disposed apart from each other in the circumferential direction. In this case, a separation distance D1 between the 1-1 protrusion 341A and the 1-2 protrusion 342A may be greater than the width W1 of the 1-1 protrusion 341A or the width W2 of the 1-2 protrusion 342A in the circumferential direction. In addition, a surface of the 1-1 protrusion 341A and a surface of the 1-2 protrusion 342A which face each other may be formed as inclined surfaces S. In this case, the inclined surfaces S may be formed on lower end portions of the 1-1 protrusion 341A and the 1-2 protrusion 342A. In this case, the inclined surfaces S may be further away from each other toward lower sides.

Figure 8:
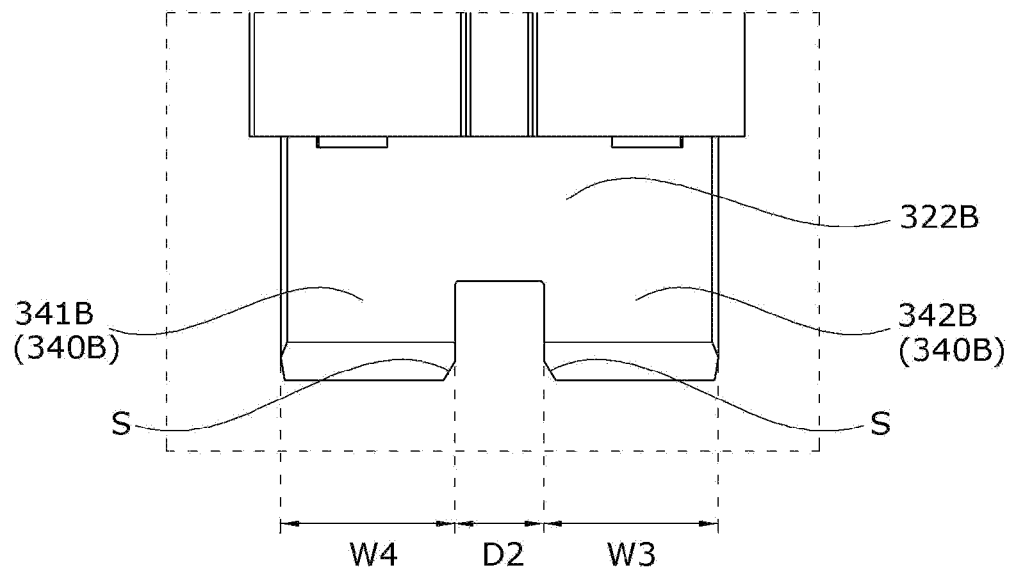
FIG. 8 is a view illustrating a state of a second part from the outside.

FIG. 8 is a view illustrating a state of the second part from the outside.

Referring to FIG. 8, the second part 340B may include a 2-1 protrusion 341B and a 2-2 protrusion 342B. The 2-1 protrusion 341B may extend from one side of the lower end of the second guide 322B. In addition, the 2-2 protrusion 342B may extend from another side of the lower end of the second guide 322B. A width W4 of the 2-1 protrusion 341B in the circumferential direction may be the same as a width W3 of the 2-2 protrusion 342B in the circumferential direction. The 2-1 protrusion 341B and the 2-2 protrusion 342B may be disposed apart from each other in the circumferential direction. In this case, a separation distance D2 between the 2-1 protrusion 341B and the 2-2 protrusion 342B may be smaller than the width W4 of the 2-1 protrusion 341B or the width W3 of the 2-2 protrusion 342B in the circumferential direction. In addition, a surface of the 2-1 protrusion 341B and a surface of the 2-2 protrusion 342B which are face each other may be formed as inclined surfaces S. In this case, the inclined surfaces S of the 2-1 protrusion 341B and of the 2-2 protrusion 342B may be formed on lower end portions. In this case, the inclined surfaces S may be further away from each other toward lower sides.

Figure 9:
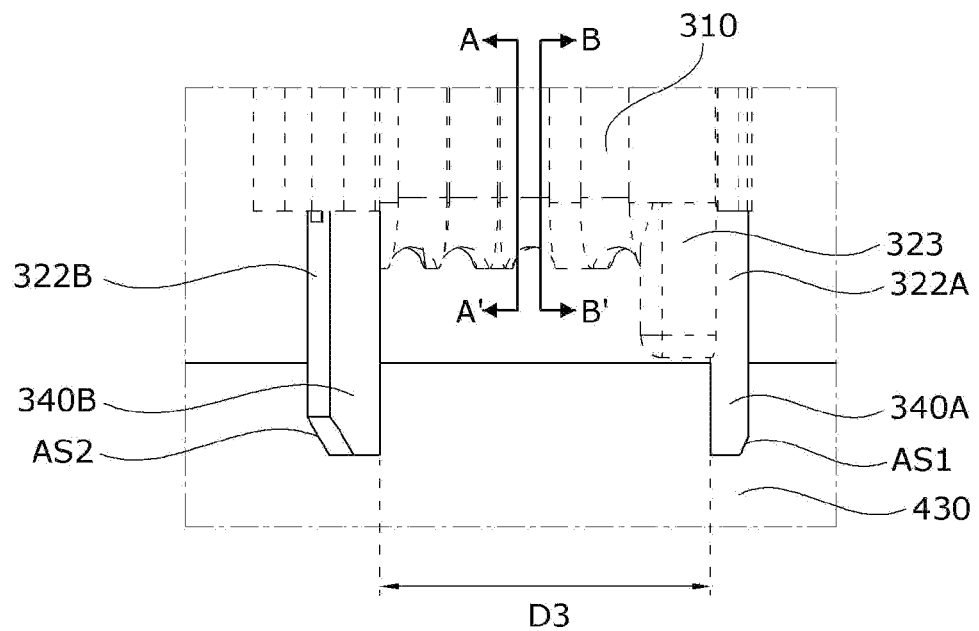
FIG. 9 is a side view illustrating the first part, the second part, and a protruding part.
Figure 10:
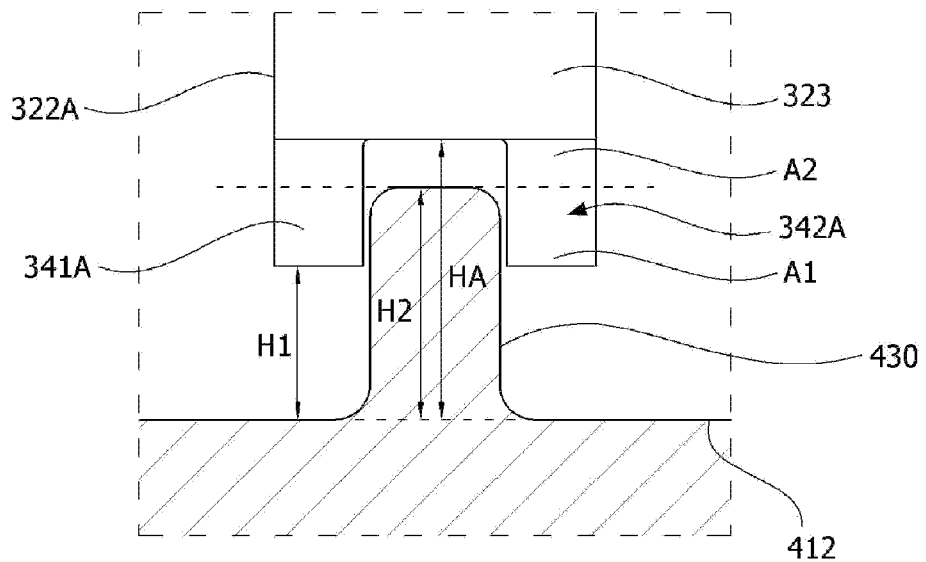
FIG. 10 is a cross-sectional view along line AA' of FIG. 9.
Figure 11:
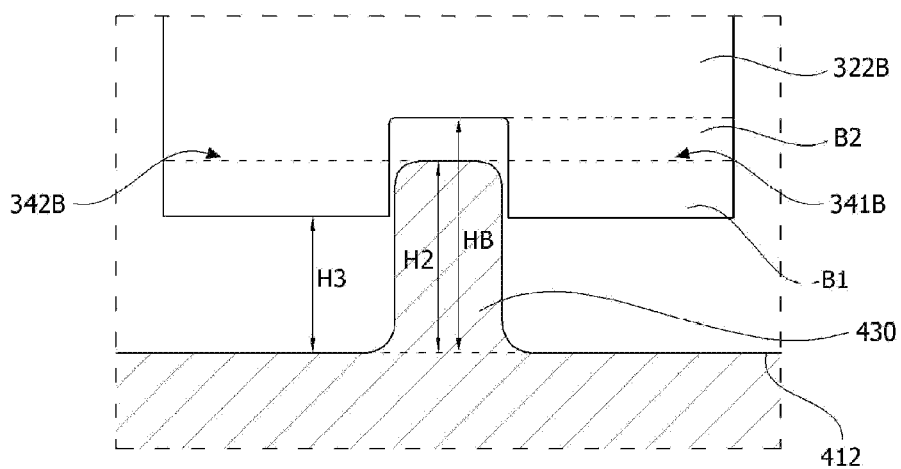
FIG. 11 is a cross-sectional view along line BB' of FIG. 9.

FIG. 9 is a side view illustrating the first part, the second part, and the protruding part, FIG. 10 is a cross-sectional view along line AA' of FIG. 9, and FIG. 11 is a cross-sectional view along line BB' of FIG. 9.

Referring to FIG. 9, the first guide 322A and the second guide 322B may be disposed apart from each other in the radial direction. In this case, a direction from the second guide 322B toward the first guide 322A is an inward direction in the radial direction, and a direction from the first guide 322A toward the second guide 322B is an outward direction in the radial direction. In this case, a convex step 323 may be formed on an outer surface of the first guide 322A. In this case, the convex step 323 may be disposed under the body 321.

The first part 340A may extend from the lower end of the first guide 322A, and the second part 340B may extend from the lower end of the second guide 322B. The first part 340A and the second part 340B are disposed apart from each other in the radial direction. A separation distance D3 between the first part 340A and the second part 340B may be the same as the length of the body 321 in the radial direction. In this case, at least a part of the first part 340A and at least a part of the second part 340B may overlap the protruding part 430 in the circumferential direction.

A length of the first part 340A and a length of the second part 340B may be the same in the axial direction. Meanwhile, a thickness of the second part 340B in the circumferential direction may be greater than a thickness of the first part 340A in the circumferential direction. The first part 340A may include a first inclined surface AS1. The first inclined surface AS1 may be disposed on a lower end of an inner surface of the first part 340A. In addition, the second part 340B may include a second inclined surface AS2. The second inclined surface AS2 may be disposed on a lower end of an outer surface of the second part 340B.

Referring to FIG. 10, the 1-1 protrusion 341A and the 1-2 protrusion 342A may be spaced apart from each other in the circumferential direction. In addition, the protruding part 430 may be disposed in a separation space between the 1-1 protrusion 341A and the 1-2 protrusion 342A. In this case, at least a part of the 1-1 protrusion 341A and at least a part of the 1-2 protrusion 342A may overlap the protruding part 430 in the circumferential direction. Meanwhile, the 1-1 protrusion 341A and the 1-2 protrusion 342A do not overlap the protruding part 430 in the radial direction.

Each of the 1-1 protrusion 341A and the 1-2 protrusion 342A may include a first region A1 and a second region A2. The first region A1 overlaps the protruding part 430 in the circumferential direction. In this case, a lower end of the first region A1 is disposed at a higher level than the lower surface 412 of the housing. Based on the lower surface 412 of the housing 400, a height H1 of the first region A1 may be smaller than a height H2 of the protruding part 430. In addition, based on the lower surface 412 of the housing 400, the height H2 of the protruding part 430 may be smaller than a height HA of the first guide 322A. The second region A2 connects the first region A1 and the first guide 322A. The second region A2 does not overlap the protruding part 430 in the circumferential direction. In this case, a length of the second region A2 in the axial direction is smaller than a length of the first region A1 in the axial direction.

Referring to FIG. 11, the 2-1 protrusion 341B and the 2-2 protrusion 342B may be spaced apart from each other in the circumferential direction. In addition, the protruding part 430 may be disposed in a separation space between the 2-1 protrusion 341B and the 2-2 protrusion 342B. In this case, at least a part of the 2-1 protrusion 341B and at least a part of the 2-2 protrusion 342B may overlap the protruding part 430 in the circumferential direction. Meanwhile, the 2-1 protrusion 341B and the 2-2 protrusion 342B do not overlap the protruding part 430 in the radial direction.

Each of the 2-1 protrusion 341B and the 2-2 protrusion 342B may include a first region B1 and a second region B2. Based on the lower surface 412 of the housing 400, a height H3 of the first region B1 may be smaller than the height H2 of the protruding part 430. In addition, based on the lower surface 412 of the housing 400, the height H2 of the protruding part 430 may be smaller than a height HB of the second guide 322B. The second region B2 connects the first region B1 and the second guide 322B. The second region B2 does not overlap the protruding part 430 in the circumferential direction. In this case, a length of the second region B2 in the axial direction is smaller than a length of the first region B1 in the axial direction.

Figure 12:
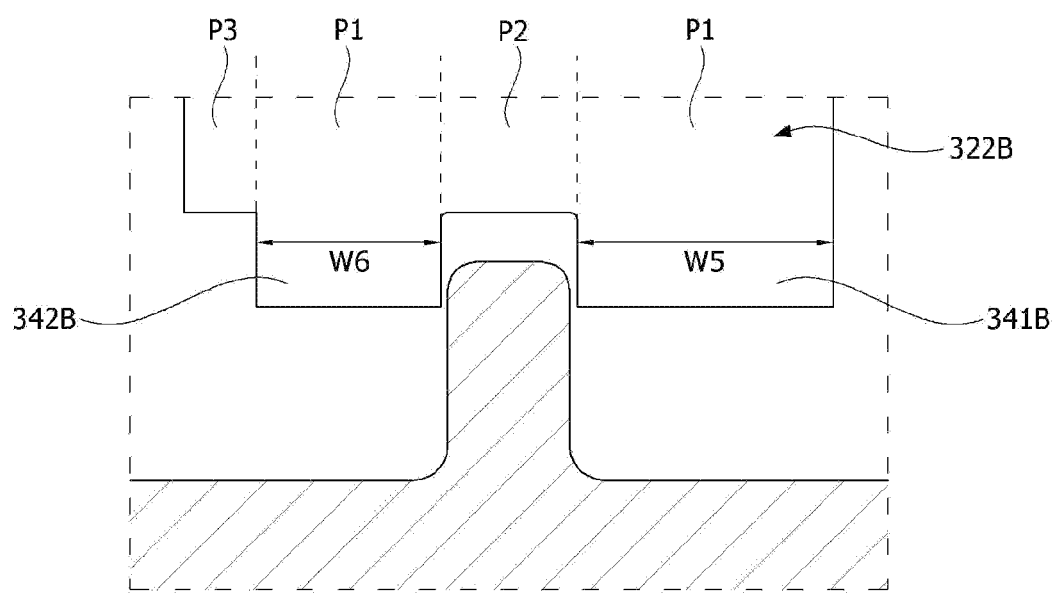
FIG. 12 is a view illustrating a modified example of the second part illustrated in FIG. 11.

FIG. 12 is a view illustrating a modified example of the second part illustrated in FIG. 11.

Referring to FIG. 12, a 2-1 protrusion 341B and a 2-2 protrusion 342B may have different shapes. The 2-1 protrusion 341B and the 2-2 protrusion 342B may have different widths in a circumferential direction. A width W5 of the 2-1 protrusion 341B in the circumferential direction may be greater than a width W6 of the 2-2 protrusion 342B in the circumferential direction. In this case, the 2-1 protrusion 341B and the 2-2 protrusion 342B may have the same length in an axial direction.

A second guide 322B may include a plurality of first portions P1, a second portion P2, and a third portion P3. The first portion P1 may be provided as the plurality of first portions P1. The first portions P1 may overlap the 2-1 protrusion 341B or the 2-2 protrusion 342B in the axial direction. The plurality of first portions P1 may have different widths in the circumferential direction. The plurality of first portions P1 may be spaced apart from each other in the circumferential direction. The second portion P2 may be disposed in a separation space between the plurality of first portions P1. The second portion P2 may overlap the protruding part 430 in the axial direction. A lower end of the second portion P2 may be spaced apart from an upper surface of the protruding part 430. The third portion P3 may be disposed at one side of the one of the plurality of first portions P1. The third portion P3 may be disposed at one side of the first portion P1 having a small width in the circumferential direction among the plurality of first portions P1. A width of the third portion P3 in the circumferential direction may be smaller than the widths of the first portions P1 or a width of the second portion P2. The third portion P3 may be disposed adjacent to the first portion P1 of the different adjacent second guide.

Figure 13:
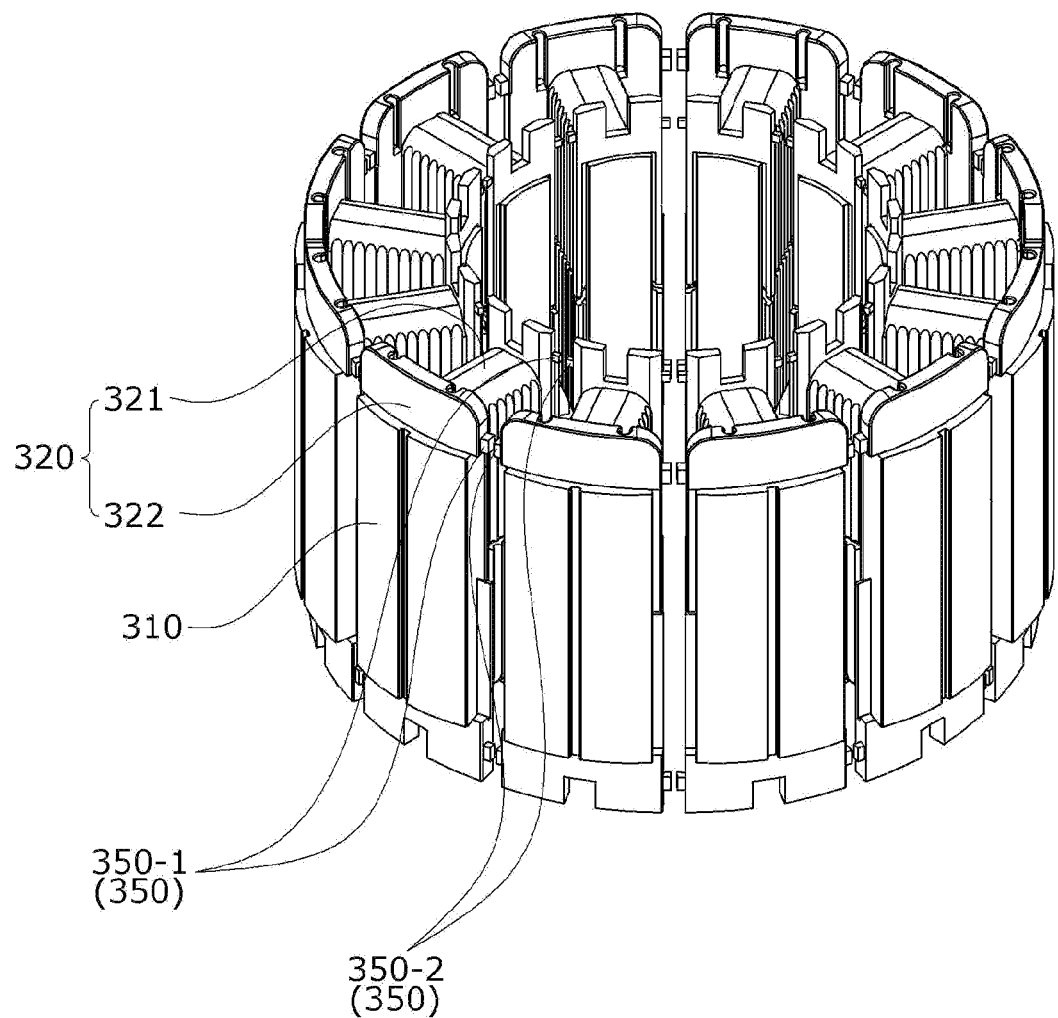
FIG. 13 is a perspective view illustrating a stator of a motor according to a second embodiment.

FIG. 13 is a perspective view illustrating a stator of a motor according to a second embodiment.

Referring to FIG. 13, insulators 320 may include bridges 350. The plurality of insulators 320 may be injection-molded in a state in which the plurality of insulators 320 are connected by the bridges. In addition, the plurality of insulators 320 may be assembled with a plurality of stator cores 310 and separated from each other. In this case, one sides of the bridges of the plurality of insulators 320 may be cut. In this case, the cut bridges may remain in a state of protruding from the insulators 320.

The bridges 350 are formed to protrude from guides 322 in a circumferential direction. The bridges 350 have different lengths. The bridges 350 may have curvatures about a center of a stator 300. The bridges 350 may have the same separation distance from the center of the stator 300. In addition, thicknesses of the bridges 350 in a radial direction may decrease toward end portions.

The bridges 350 may include first bridges 350-1 and second bridges 350-2.

The first bridge 350-1 may extend from one side of the guide 322. In addition, the second bridge 350-2 may extend from another side of the guide 322. In this case, the first bridges 350-1 of any one insulator 320 may face the second bridges 350-2 of the other adjacent insulator 320. The first bridge 350-1 and the second bridge 350-2 facing each other may and be spaced apart from each other in the circumferential direction. In addition, the first bridges 350-1 and the second bridges 350-2 may have different lengths in the circumferential direction.

Figure 14:
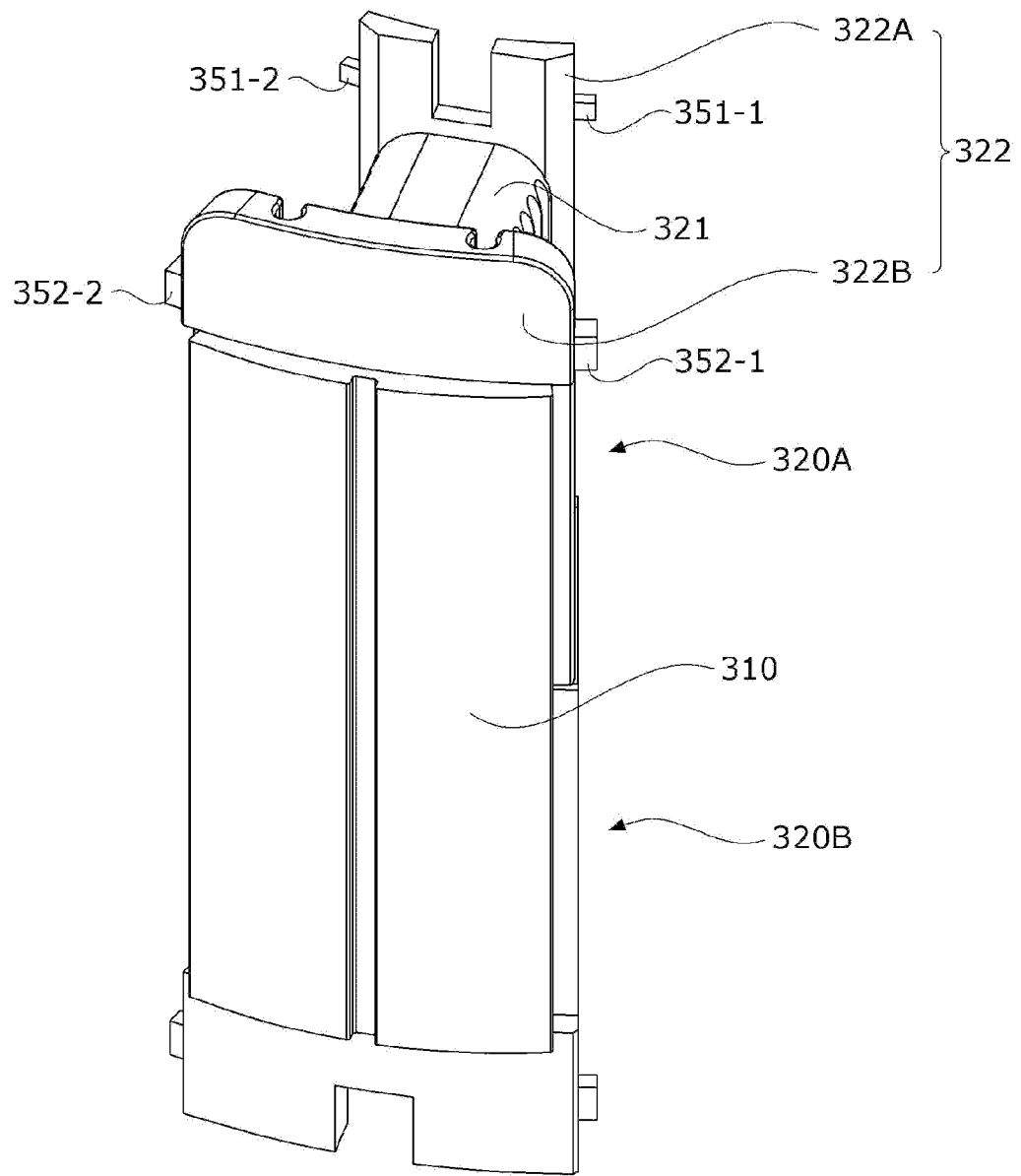
FIG. 14 is a perspective view illustrating a part of a stator.

FIG. 14 is a perspective view illustrating a part of a stator.

Referring to FIG. 14, a 1-1 bridge 351-1 and a 1-2 bridge 351-2 may be formed to protrude from a first guide 322A. In this case, the 1-1 bridge 351-1 may be formed to protrude from one side of the first guide 322A in a circumferential direction. In addition, the 1-2 bridge 351-2 may be formed to protrude from another side in the circumferential direction. In this case, the 1-1 bridge 351-1 of any one insulator 320 may face the 1-2 bridge 351-2 of another insulator 320 adjacent thereto.

A 2-1 bridge 352-1 and a 2-2 bridge 352-2 may be formed to protrude from a second guide 322B. The 2-1 bridge 352-1 may be formed to protrude from one side of the second guide 322B in the circumferential direction. In addition, the 2-2 bridge 352-2 may be formed to protrude from another side in the circumferential direction. In this case, the 2-1 bridge 352-1 of any one insulator 320 may face the 2-2 bridge 352-2 of another insulator 320 adjacent thereto.

Figure 15:
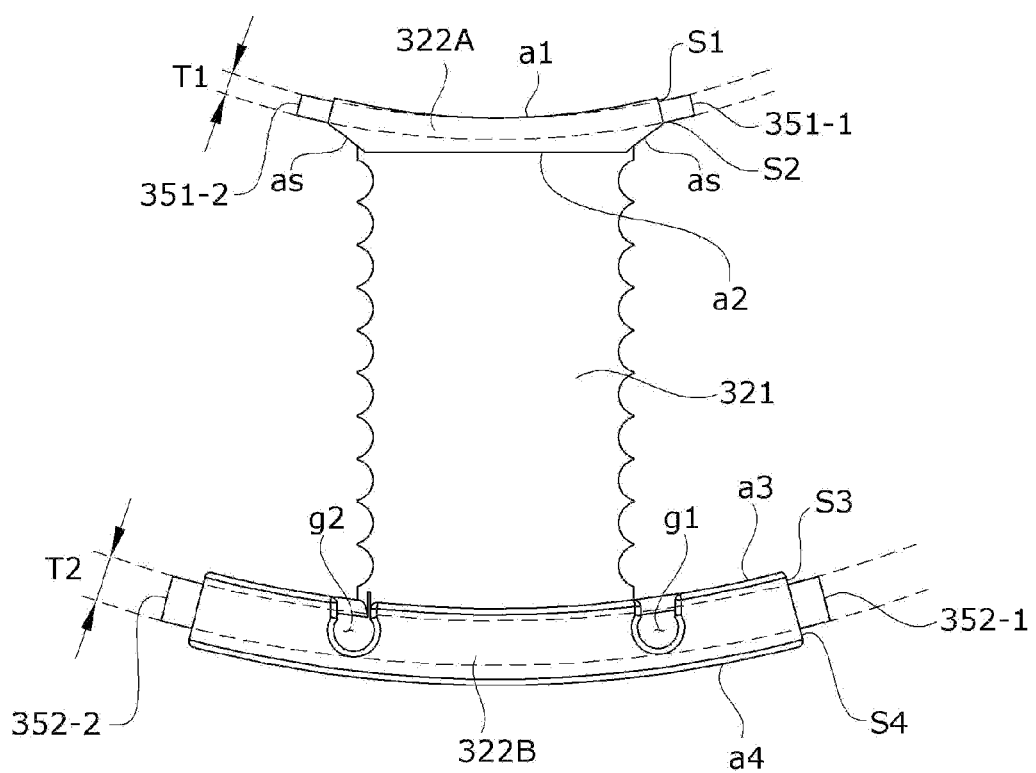
FIG. 15 is a plan view of FIG. 14.

FIG. 15 is a plan view of FIG. 14.

Referring to FIG. 15, the first guide 322A may include a first surface a1 facing inward and a second surface a2 facing outward. In this case, the 1-1 bridge 351-1 and the 1-2 bridge 351-2 may be disposed between the first surface a1 and the second surface a2 in a radial direction. In this case, a first step S1 may be disposed between the first surface a1 and the 1-1 bridge 351-1. In addition, a first step S1 may also be disposed between the first surface a1 and the 1-2 bridge 351-2. Meanwhile, a second step S2 may be disposed between the second surface a2 and the 1-1 bridge 351-1. In addition, a second step S2 may also be disposed between the second surface a2 and the 1-2 bridge 351-2. In this case, inclined surfaces as may be disposed at edges of two sides of the second surface a2. Distances between the inclined surfaces and the first surface a1 decrease toward end portions.

The second guide 322B may include a third surface a3 facing inward and a fourth surface a4 facing outward. In this case, the 2-1 bridge 352-1 and the 2-2 bridge 352-2 may be disposed between the third surface a3 and the fourth surface a4 in the radial direction. In this case, third steps S3 may be formed between the third surface a3 and inner surfaces of the 2-1 bridge 352-1 and the 2-2 bridge 352-2. In addition, fourth steps S4 may also be formed between the fourth surface a4 and outer surfaces of the 2-1 bridge 352-1 and the 2-2 bridge 352-2. In this case, the third steps S3 may be greater than the first steps S1, and the fourth steps S4 may be greater than the second steps S2.

A first groove g1 and a second groove g2 may be disposed in the third surface a3. A coil 330 is disposed in the first groove g1 and the second groove g2. The coil 330 may be disposed in an axial direction. In this case, the first groove g1 and the second groove g2 may guide a finishing end and a starting end of the wound coil 330. The first groove g1 and the second groove g2 may be disposed apart from each other in the circumferential direction. The first groove g1 and the second groove g2 may be disposed between the 2-1 bridge 352-1 and the 2-2 bridge 352-2 in the circumferential direction. In addition, a tooth may be disposed between the first groove g1 and the second groove g2 in the circumferential direction.

The 1-1 bridge 351-1 and the 1-2 bridge 351-2 may have the same thickness in the radial direction. In addition, the 2-1 bridge 352-1 and the 2-2 bridge 352-2 may have the same thickness in the radial direction. In this case, the thickness of each of the 1-1 bridge 351-1 and the 1-2 bridge 351-2 in the radial direction may be a first thickness T1. In addition, the thickness of each of the 2-1 bridge 352-1 and the 2-2 bridge 352-2 in the radial direction may be a second thickness T2. In this case, the first thickness T1 may be smaller than a thickness of the first guide 322A. In addition, the second thickness T2 may be smaller than a thickness of the second guide 322B. A ratio of the second thickness T2 to the thickness of the second guide 322B in the radial direction may be less than 0.5. For example, the ratio of the second thickness T2 to the thickness of the second guide 322B in the radial direction may be in the range of 0.35 to 0.45. In addition, the second thickness T2 may be greater than the first thickness T1. A ratio of the first thickness T1 to the second thickness T2 may be less than 0.7. For example, the ratio of the first thickness T1 to the second thickness T2 may be less than 0.5.

In this case, the each of the insulators 320 may include an upper insulator 320A and a lower insulator 320B. The upper insulator 320A and the lower insulator 320B are coupled in the axial direction. The upper insulator 320A is installed on an upper side of a stator core 310 and surrounds an upper portion of the stator core 310, and the lower insulator 320B is installed on a lower side of the stator core 310 and surrounds a lower portion of the stator core 310.

Figure 16:
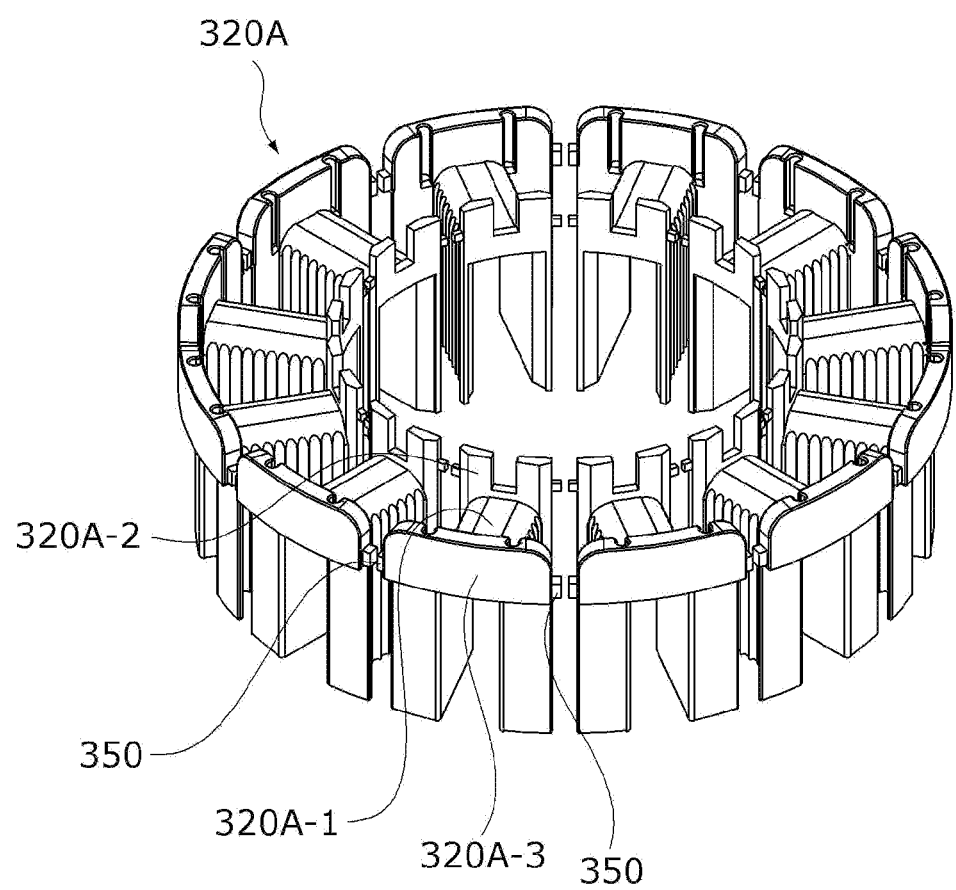
FIG. 16 is a perspective view illustrating an upper insulator.
Figure 17:
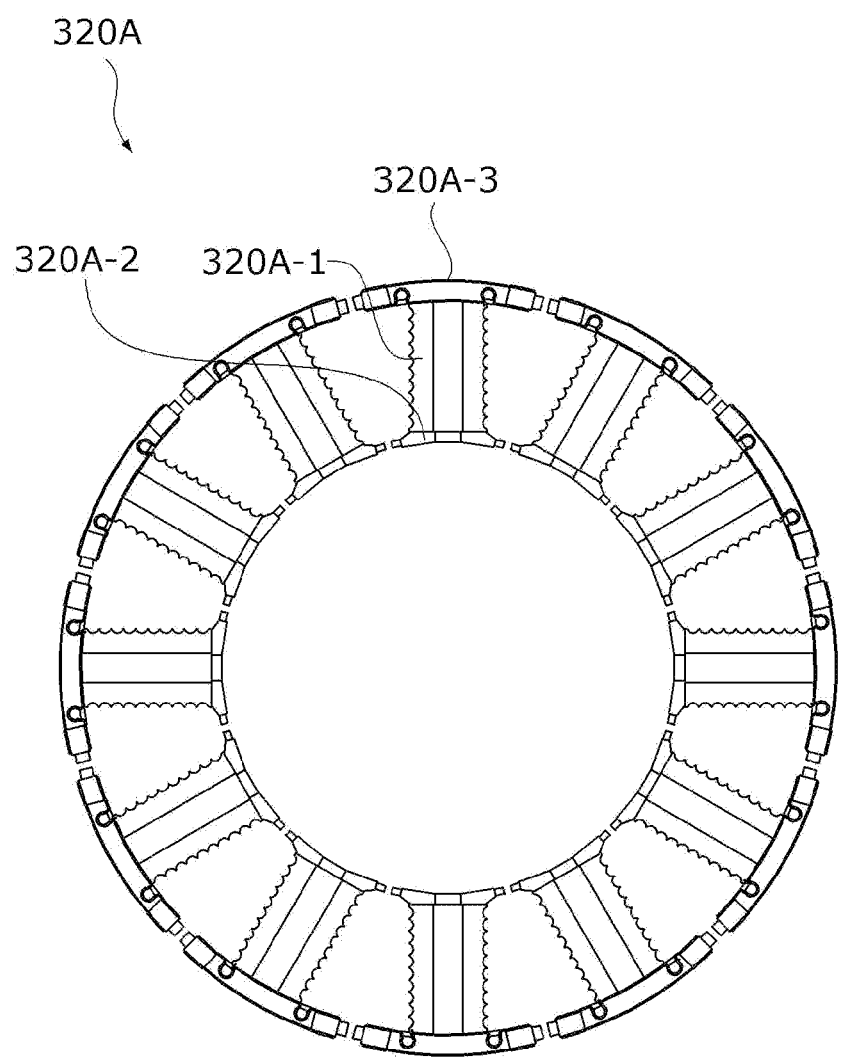
FIG. 17 is a plan view illustrating the upper insulator.
Figure 18:
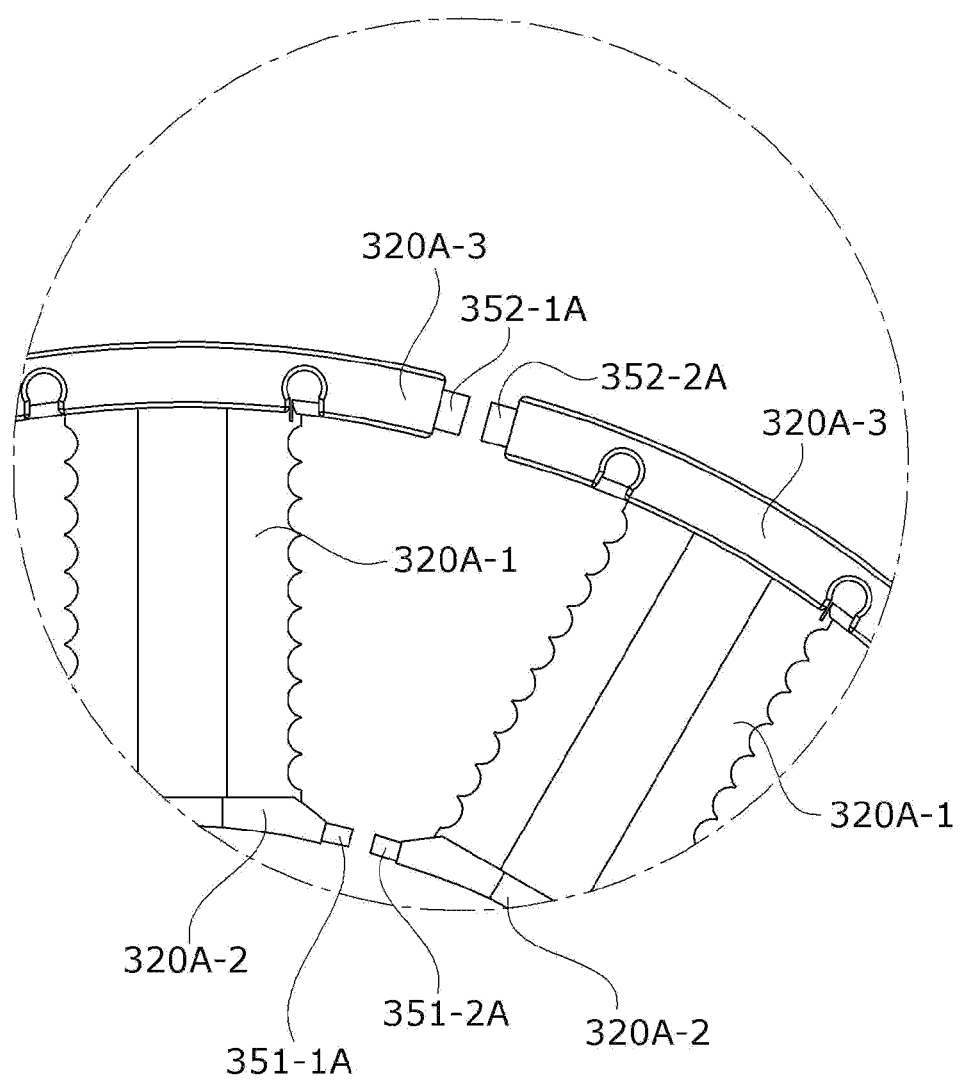
FIG. 18 is a partially enlarged view of FIG. 17.

FIG. 16 is a perspective view illustrating the upper insulator, FIG. 17 is a plan view illustrating the upper insulator, and FIG. 18 is a partially enlarged view of FIG. 17.

Referring to FIGS. 16 and 17, the upper insulator 320A may include an upper body 320A-1, a first upper guide 320A-2, and a second upper guide 320A-3. The upper body 320A-1 surrounds an upper portion of the tooth. The first upper guide 320A-2 extends inward from the upper body 320A-1. In addition, the second upper guide 320A-3 extends outward from the upper body 320A-1. An upper end of the first upper guide 320A-2 and an upper end of the second upper guide 320A-3 may be disposed at higher levels than an upper surface of the upper body 320A-1. The bridges 350 may be formed to protrude from the first upper guide 320A-2 and the second upper guide 320A-3.

Referring to FIG. 18, a 1-1 upper bridge 351-1A and a 1-2 upper bridge 351-2A may be disposed on the first upper guide 320A-2. The 1-1 upper bridge 351-1A may extend from one side of the first upper guide 320A-2 in the circumferential direction. In addition, the 1-2 upper bridge 351-2A may extend from another side of the first upper guide 320A-2 in the circumferential direction. In this case, the 1-1 upper bridge 351-1A and the 1-2 upper bridge 351-2A may overlap in the circumferential direction. The 1-1 upper bridge 351-1A of any one insulator 320 may face the 1-2 upper bridge 351-2A of another insulator 320 adjacent thereto.

A 2-1 upper bridge 352-1A and a 2-2 upper bridge 352-2A may be disposed on the second upper guide 320A-3. The 2-1 upper bridge 352-1A may extend from one side of the second upper guide 320A-3 in the circumferential direction. In addition, the 2-2 upper bridge 352-2A may extend from another side of the second upper guide 320A-3 in the circumferential direction. In this case, the 2-1 upper bridge 352-1A and the 2-2 upper bridge 352-2A may overlap in the circumferential direction. The 2-1 upper bridge 352-1A of any one insulator 320 may face the 2-2 upper bridge 352-2A of another insulator 320 adjacent thereto.

Figure 19:
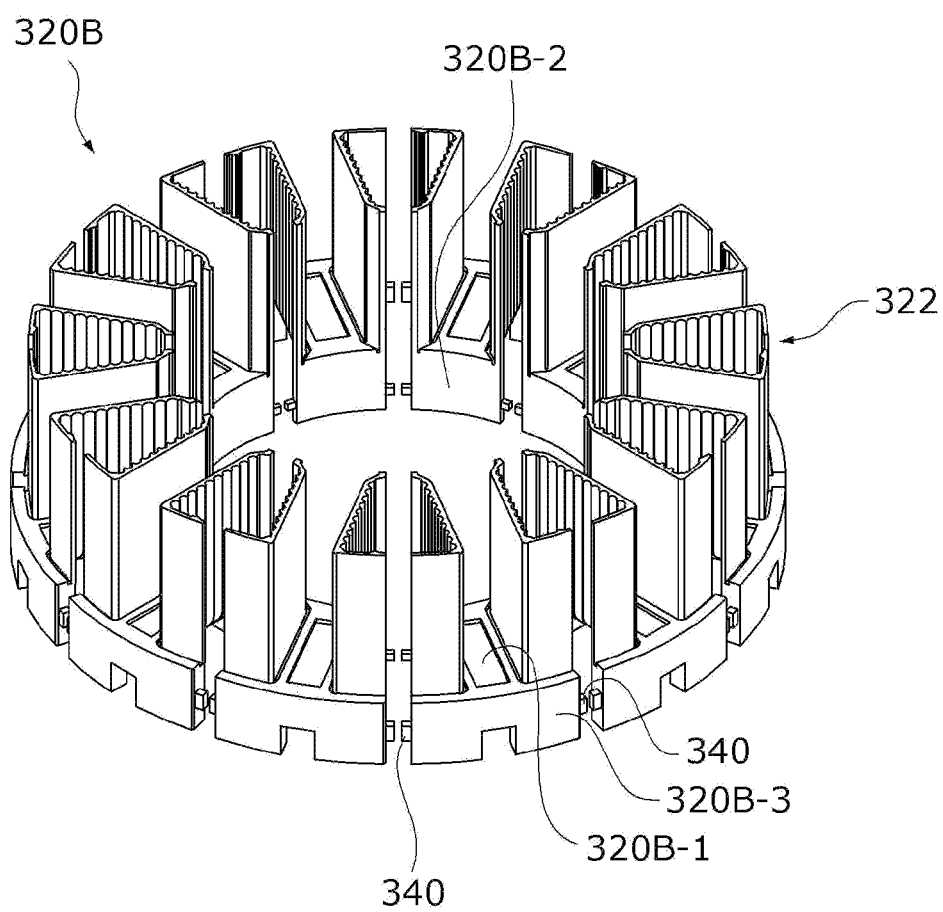
FIG. 19 is a perspective view illustrating a lower insulator.
Figure 20:
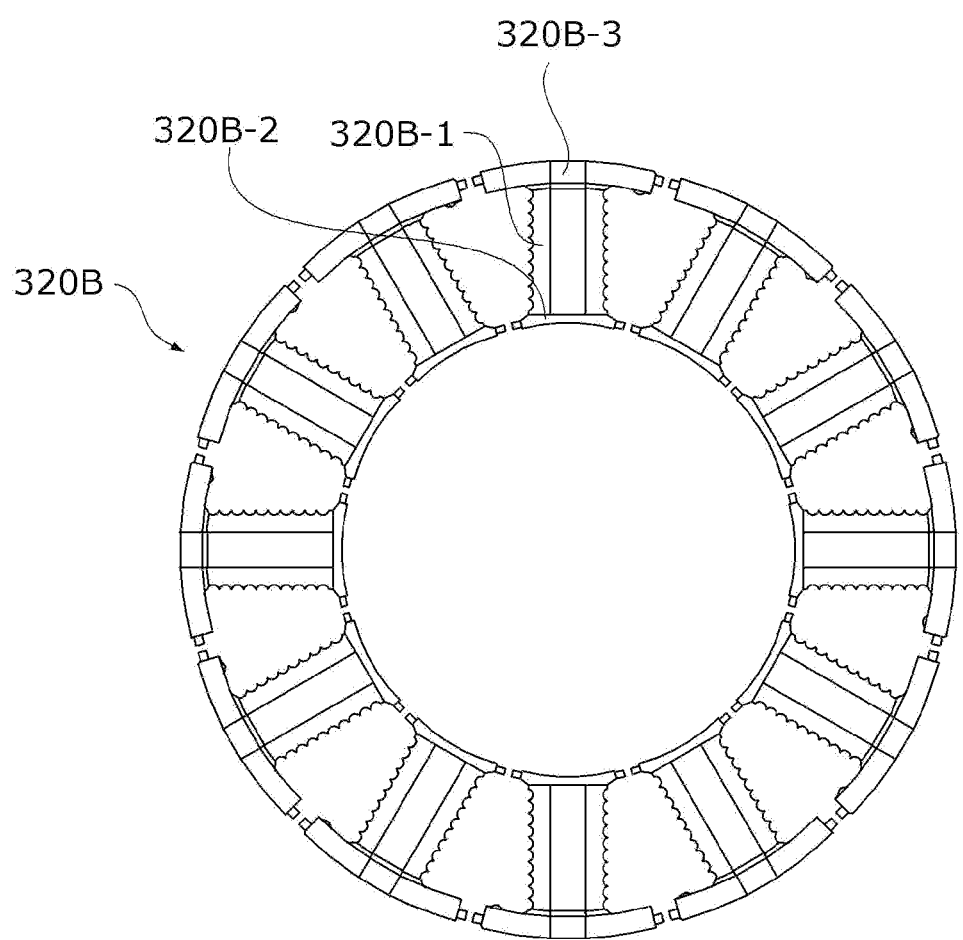
FIG. 20 is a bottom view illustrating an insulator.
Figure 21:
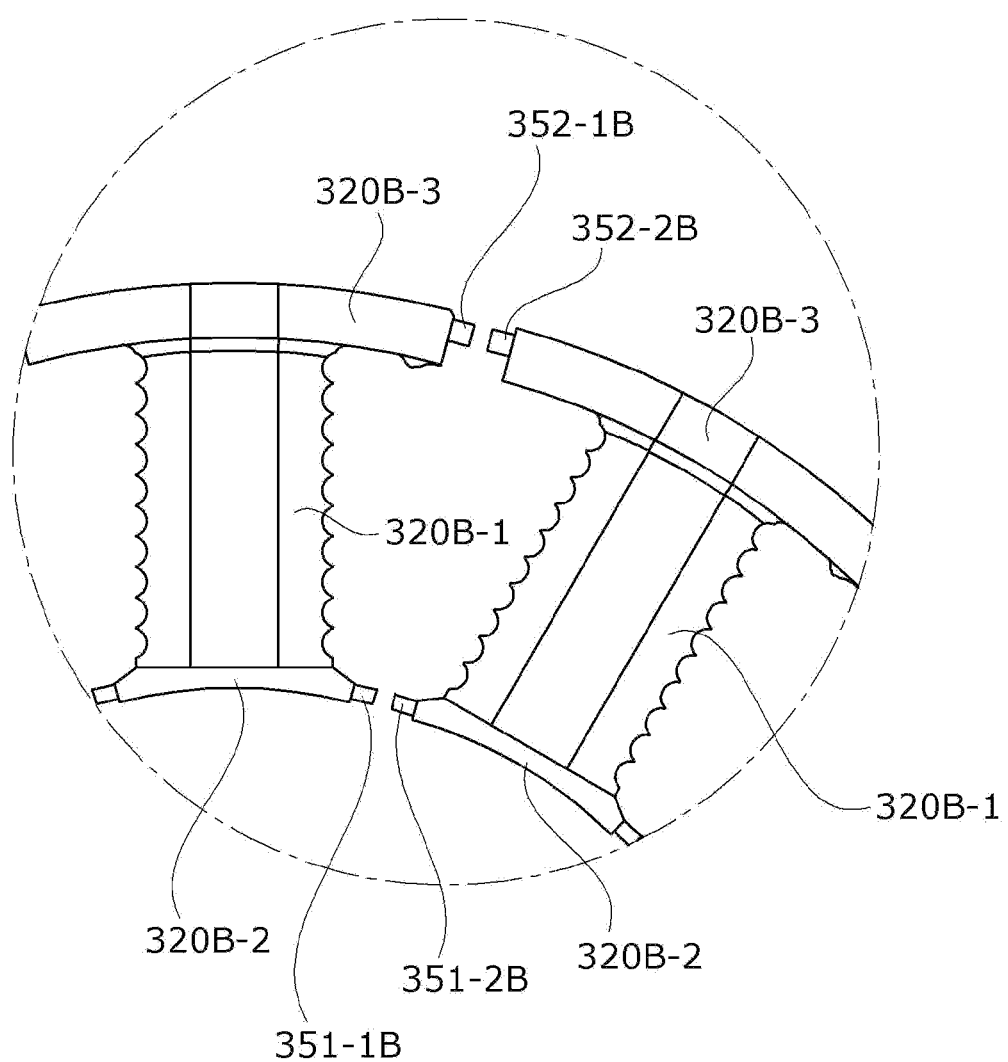
FIG. 21 is a partially enlarged view of FIG. 20.

FIG. 19 is a perspective view illustrating the lower insulator, FIG. 20 is a bottom view illustrating the insulator, and FIG. 21 is a partially enlarged view of FIG. 20.

Referring to FIGS. 19 and 20, the lower insulator 320B may include a lower body 320B-1, a first lower guide 320B-2, and a second lower guide 320B-3. The lower body 320B-1 surrounds a lower portion of the tooth. The first lower guide 320B-2 extends inward from the lower body 320B-1. The second lower guide 320B-3 extends outward from the lower body 320B-1. A lower end of the first lower guide 320B-2 and a lower end of the second lower guide 320B-3 may be disposed at lower levels than a lower surface of the lower body 320B-1. The bridges 350 may be formed to protrude from the first lower guide 320B-2 and the second lower guide 320B-3.

Referring to FIG. 21, a 1-1 lower bridge 351-1B and a 1-2 lower bridge 351-2B may be formed to protrude from the first lower guide 320B-2.

The 1-1 lower bridge 351-1B may extend from one side of the first lower guide 320B-2 in the circumferential direction. In addition, the 1-2 lower bridge 351-2B may extend from another side of the first lower guide 320B-2 in the circumferential direction. In this case, the 1-1 lower bridge 351-1B and the 1-2 lower bridge 351-2B may overlap in the circumferential direction. The 1-1 lower bridge 351-1B of any one insulator 320 may face the 1-2 lower bridge 351-2B of another insulator 320 adjacent thereto.

The 2-1 lower bridge 352-1B and the 2-2 lower bridge 352-2B may be formed to protrude from the second lower guide 320B-3.

The 2-1 lower bridge 352-1B may extend from one side of the second lower guide 320B-3 in the circumferential direction. In addition, the 2-2 lower bridge 352-2B may extend from another side of the second lower guide 320B-3 in the circumferential direction. In this case, the 2-1 lower bridge 352-1B and the second lower guide 320B-3 may overlap in the circumferential. The 2-1 lower bridge 352-1B of any one insulator 320 may face the 2-2 lower bridge 352-2B of another insulator 320 adjacent thereto.

Figure 22:
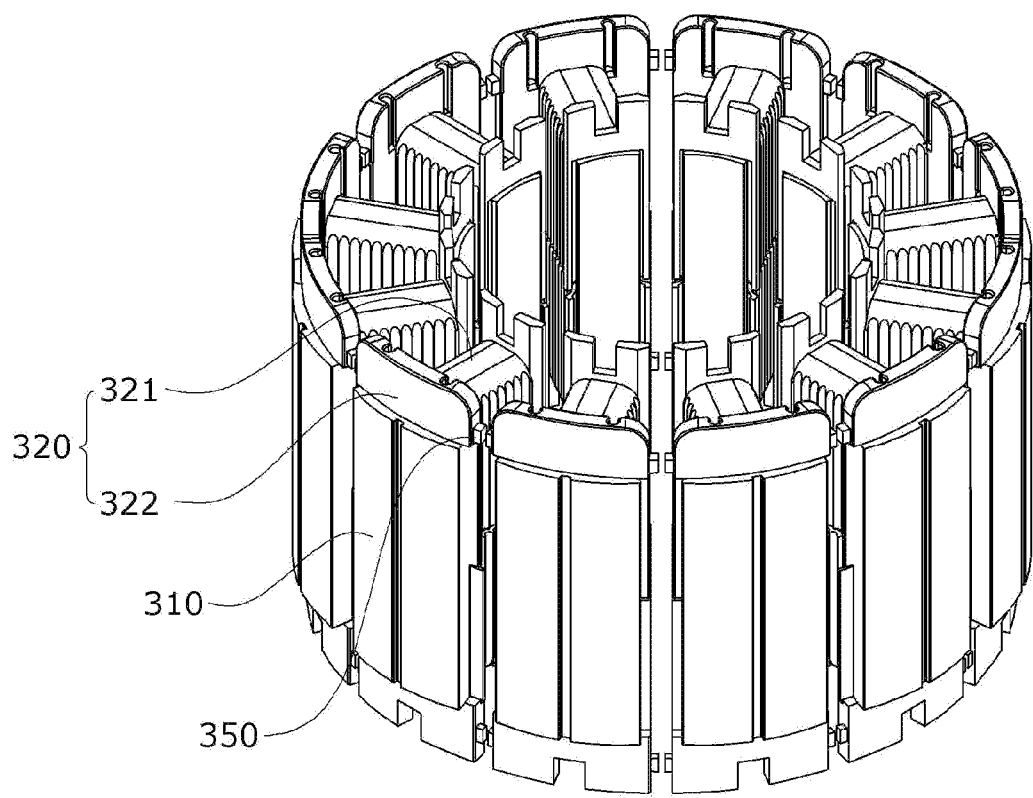
FIG. 22 is a perspective view illustrating a stator of a motor according to a third embodiment.
Figure 23:
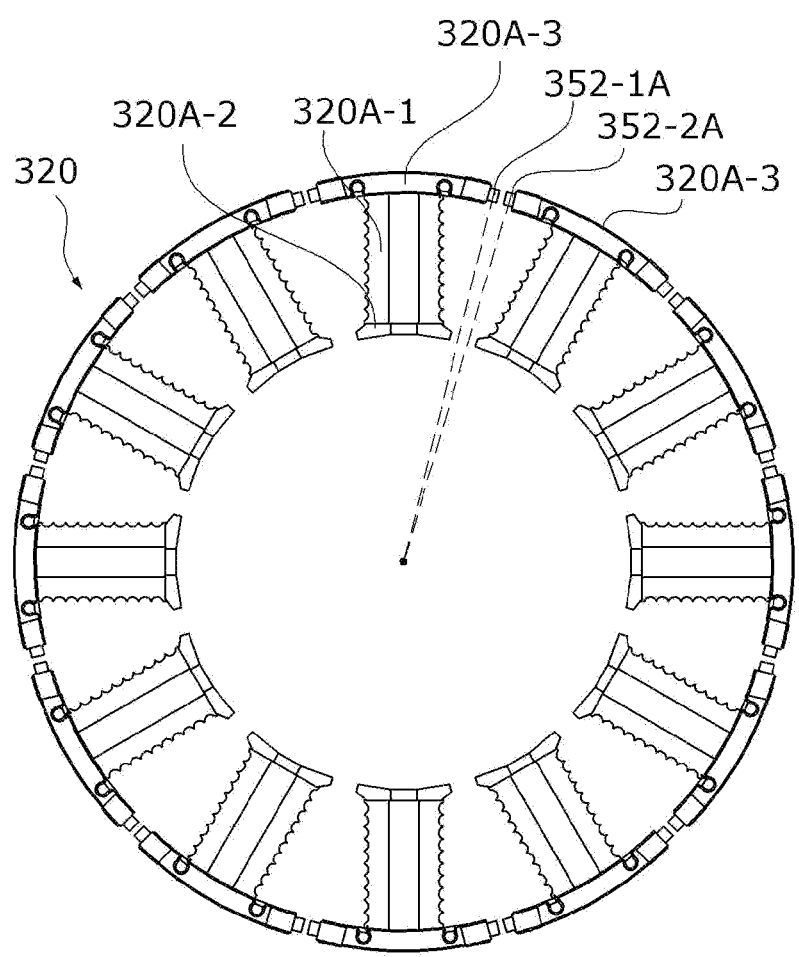
FIG. 23 is a plan view illustrating an upper insulator.
Figure 24:
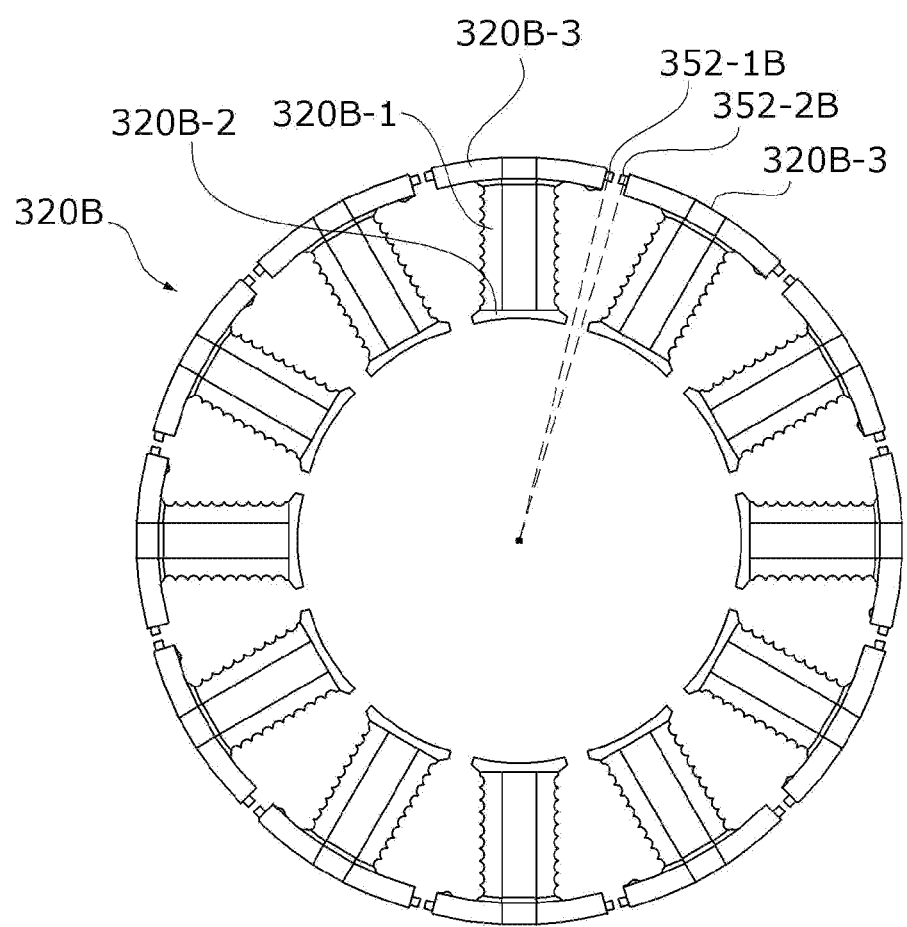
FIG. 24 is a bottom view illustrating a lower insulator.

FIG. 22 is a perspective view illustrating a stator of a motor according to a third embodiment, FIG. 23 is a plan view illustrating an upper insulator, and FIG. 24 is a bottom view illustrating a lower insulator.

Referring to FIGS. 22 to 24, bridges 350 may be disposed at an outer side of a body 321. The bridges 350 may be disposed on an outer guide of an insulator. In this case, the bridges 350 are disposed outside the body 321.

The bridges 350 may be disposed on a second upper guide 320A-3 and a second lower guide 320B-3. The bridges 350 may include a 2-1 upper bridge 352-1A, a 2-2 upper bridge 352-2A, a 2-1 lower bridge 352-1B, and a 2-2 lower bridge 352-2B. The 2-1 upper bridge 352-1A and the 2-2 upper bridge 352-2A may be formed to protrude from the second upper guide 320A-3. In this case, the 2-1 upper bridge 352-1A and the 2-2 upper bridge 352-2A do not overlap the first upper guide 320A-2 in a radial direction.

The 2-1 lower bridge 352-1B and the 2-2 lower bridge 352-2B may be formed to protrude from the second lower guide 320B-3. In this case, the 2-1 lower bridge 352-1B and the 2-2 lower bridge 352-2B do not overlap the first lower guide 320B-2 in the radial direction.

Accordingly, a motor according to the present embodiment has a form in which the 1-1 upper bridge 351-1A, the 1-2 upper bridge 351-2A, the 1-1 lower bridge 351-1B, and the 1-2 lower bridge 351-2B are omitted from the motor illustrated in FIGS. 13 to 21. In the motor according to the present embodiment, since the bridges are only disposed outside a stator, accessibility of a cutting apparatus can be improved.

Hereinafter, a method of manufacturing the stator included in the motor according to the present embodiment will be described with reference to FIGS. 25 and 26.

Figure 25:
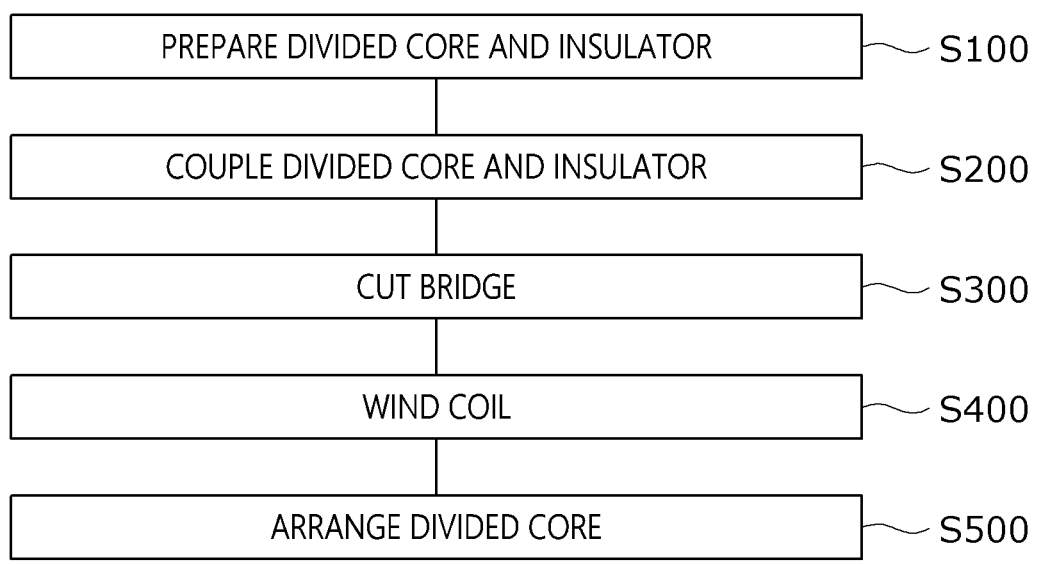
FIG. 25 is a flowchart for describing a method of manufacturing the stator of the motor according to the second embodiment.
Figure 26:
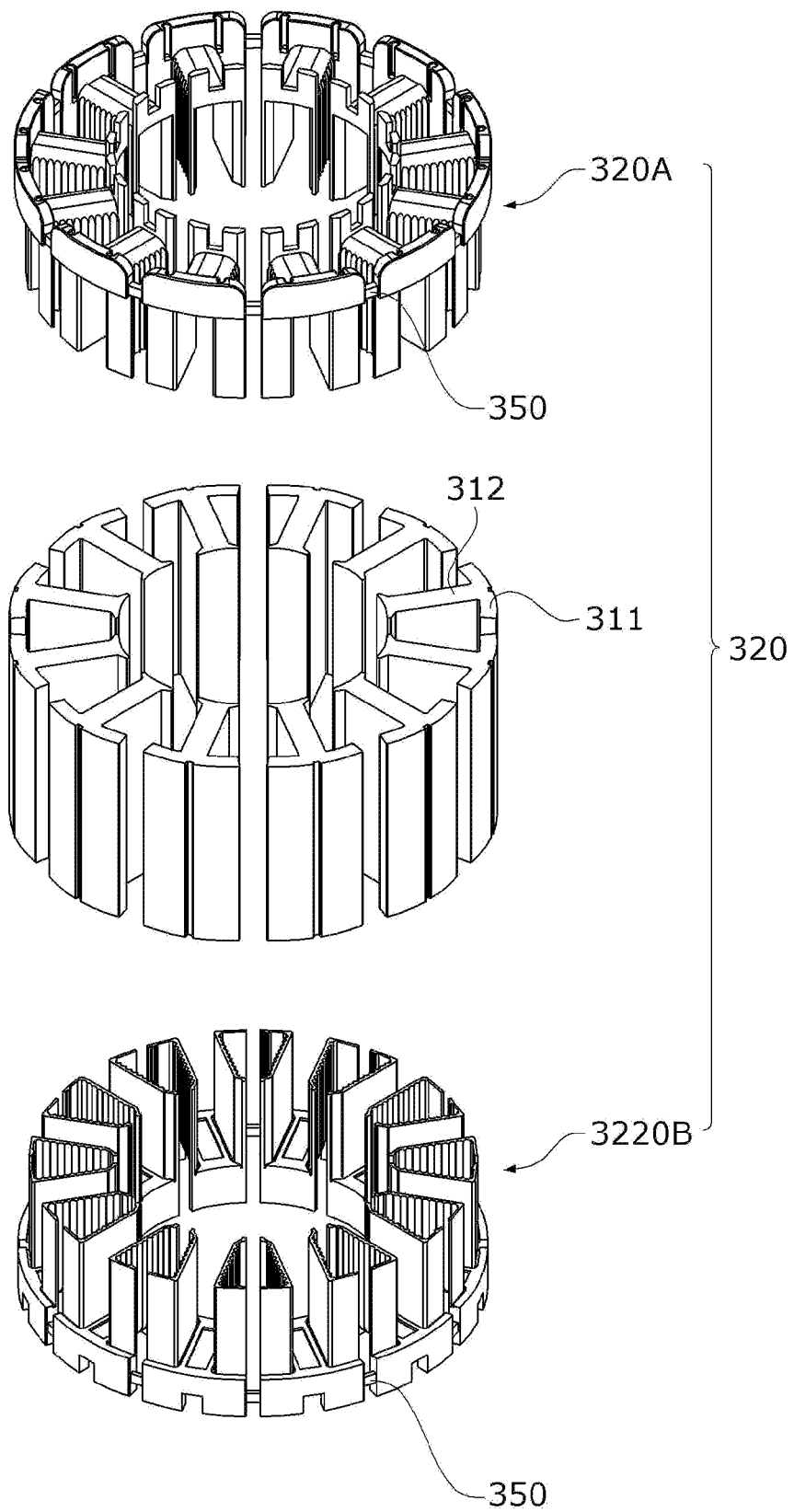
FIG. 26 is a perspective view illustrating a state in which the stator core and the insulator are being coupled in operation S200 illustrated in FIG. 25.

FIG. 25 is a flowchart for describing a method of manufacturing the stator of the motor according to the second embodiment, and FIG. 26 is a perspective view illustrating a state in which the stator core and the insulator are being coupled in operation S200 illustrated in FIG. 25.

Referring to FIG. 25, the method of manufacturing the stator included in the motor according to the embodiment of the present invention includes a preparing operation S100, a coupling operation S200, a cutting operation S300, a winding operation S400, and an arranging operation S500.

First, the stator cores 310 and the insulators 320 are prepared (S100). A space in which the stator cores 310 are disposed is formed in the insulators 320. The stator cores 310 may include a yoke 311 and a plurality of teeth 312 protruding from the yoke. In this case, the yoke 311 may be formed to be divided for each tooth 312. The insulators 320 are provided as the plurality of insulators 320. In addition, the plurality of insulators 320 are connected to each other by the bridges 350. In this case, the insulators 320 may include the insulators 320A and the lower insulators 320B.

Then, the insulators 320 are coupled to the stator cores 310 (S200).

Referring to FIG. 15, the plurality of upper insulators 320A are coupled to the stator cores 310 from above at the same time, and the plurality of lower insulators 320B are coupled to the plurality of stator cores 310 from below at the same time. In this case, the plurality of upper insulators 320A are integrally connected by the bridges 350, and the plurality of lower insulators 320B are integrally connected by the bridges 350.

Then, the bridges 350 are cut (S300). One side of each of the bridges 350 are cut using the cutting apparatus. Accordingly, the plurality of insulators may be divided. In this case, a cutting groove may be formed at one side of each of the bridges. In this case, a vicinity of the cutting groove may be cut. The cut bridge may be cut into the first bridge extending from any one insulator 320 and the second bridge extending from another insulator.

Then, the coil is wound around each of the plurality of stator cores 310 (S400). In this case, the coil may be wound around the body of each of the insulators.

Finally, the plurality of stator cores 310 are arranged (S500). The plurality of stator cores arranged in the circumferential direction based on the center of the stator. In this case, the divided first bridge and second bridge may be disposed to face each other.

In the above-described embodiment, although an example of the inner rotor type motor has been described, the present invention is not limited thereto. The present invention may also be applied to an outer rotor type motor. In addition, the motor can be used for various apparatus for vehicles or home appliances.

REFERENCE NUMERALS

100: SHAFT
200: ROTOR
300: STATOR
310: STATOR CORE
320: INSULATOR
321: BODY
322: GUIDE
322H: FIRST GROOVE
330: COIL
400: HOUSING
401: FIRST STEP
500: BUSBAR

600: COVER
610: FIRST PROTRUDING PORTION
611: FIRST SURFACE
620: SECOND PROTRUDING PORTION

The invention claimed is:

1. A motor comprising:
a shaft;
a rotor coupled to the shaft;
a stator disposed to correspond to the rotor; and
a housing disposed outside the stator,
wherein the stator includes a stator core and an insulator coupled to the stator core,
wherein the insulator includes a plurality of protrusions extending from a guide of the insulator in an axial direction,
wherein the housing includes a protruding part disposed at a lower side of the insulator,
wherein the plurality of protrusions are disposed apart from each other in a circumferential direction, and
wherein at least a part of the protruding part is disposed in a separation space formed between the plurality of protrusions,
wherein the insulator includes a first insulator and a second insulator adjacent to the first insulator,
wherein the first insulator includes a first bridge extending toward the second insulator,
wherein the second insulator includes a second bridge extending toward the first bridge, and
wherein the first bridge and the second bridge, which are arranged to face each other, are spaced apart from each other.

2. The motor of claim 1, wherein an upper end of the protruding part is disposed at a level higher than a level of a lower end of the plurality of protrusions.

3. The motor of claim 1, wherein the plurality of protrusions include:
a first protrusion extending from one side of a lower end of the insulator; and
a second protrusion extending from another side of the lower end of the insulator, and
wherein the first protrusion and the second protrusion are disposed apart from each other in the circumferential direction with the protruding part interposed therebetween.

4. The motor of claim 3, wherein a separation distance between the first protrusion and the second protrusion is greater than a width of the protruding part in the circumferential direction.

5. The motor of claim 1, wherein:
the protruding part is provided as a plurality of protruding parts;
the plurality of protruding parts are disposed on a lower surface of the housing; and
the plurality of protruding parts are disposed in a radial direction.

6. The motor of claim 1, wherein the first bridge and the second bridge have a same thickness in a radial direction.

7. The motor of claim 6, wherein a burr is formed on each of a cross section of the first bridge and a cross section of the second bridge.

8. The motor of claim 7, wherein:
the stator core includes a yoke and a plurality of teeth protruding from the yoke;
the insulator includes a body surrounding the tooth and a guide extending from the body;
the protrusion extends from a lower side of the guide; and
the bridge extends from a side surface of the guide.

9. A method of manufacturing a stator included in a motor, the method comprising:
a preparing operation of preparing a plurality of stator cores and insulators connected by a plurality of bridges;
a coupling operation of coupling the plurality of stator cores and the insulators;
a cutting operation of cutting one side of each of the bridges to divide the stator cores;
a winding operation of winding a coil around each of the plurality of stator cores; and
an arranging operation of arranging the plurality of stator cores,
wherein the insulator includes a first insulator and a second insulator adjacent to the first insulator,
wherein the first insulator includes a first bridge extending toward the second insulator,
wherein the second insulator includes a second bridge extending toward the first bridge, and
wherein the first bridge and the second bridge, which are arranged to face each other, are spaced apart from each other.

10. The method of claim 9, wherein the cutting operation includes dividing the bridges into a first bridge extending from any one insulator and a second bridge extending from another insulator.

11. A motor comprising:
a shaft;
a rotor coupled to the shaft;
a stator disposed to correspond to the rotor; and
a housing disposed outside the stator,
wherein the stator includes a stator core, an insulator coupled to the stator core, and a coil wound around the insulator,
wherein the insulator includes a body around which the coil is wound, a guide extending from the body in an axial direction, a plurality of protrusions extending from the guide in the axial direction, a first bridge extending from one side of the second guide in a circumferential direction, and a second bridge extending from the other side of the second guide in the circumferential direction,
wherein the guide includes a first guide extending from an inner side of the body and a second guide extending from an outer side of the body,
wherein a first groove and a second groove are disposed in an inner surface of the second guide to be spaced apart from each other in the circumferential direction,
wherein the insulator includes a first insulator and a second insulator adjacent to the first insulator, and
wherein the first bridge of the first insulator extending toward the second insulator is disposed to face and is spaced apart from the second bridge of the second insulator, which extends toward the first bridge.

12. The motor of claim 11, wherein the coil is disposed in the first groove and the second groove.

13. The motor of claim 11, wherein, based on a virtual line connecting an axial center to a center of a width of the body of the insulator, a distance from the first groove to the virtual line is greater than a distance from the second groove to the virtual line.

14. The motor of claim 11, wherein the first groove is disposed apart from the body in the circumferential direction.

15. The motor of claim 11,
wherein the first groove and the second groove are disposed between the first bridge and the second bridge.

16. The motor of claim 11, wherein the first groove and the second groove are formed from an upper side of the body to an upper end of the guide in the axial direction.

* * * * *